(12) United States Patent
Chen et al.

(10) Patent No.: US 10,635,947 B2
(45) Date of Patent: Apr. 28, 2020

(54) DISTRIBUTABLE CLASSIFICATION SYSTEM

(71) Applicant: SAS Institute Inc., Cary, NC (US)

(72) Inventors: Xu Chen, Apex, NC (US); Yingjian Wang, Apex, NC (US); Saratendu Sethi, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 16/587,104

(22) Filed: Sep. 30, 2019

(65) Prior Publication Data

US 2020/0104630 A1    Apr. 2, 2020

Related U.S. Application Data

(63) Continuation-in-part of application No. 16/400,157, filed on May 1, 2019, now Pat. No. 10,430,690.

(60) Provisional application No. 62/874,732, filed on Jul. 16, 2019, provisional application No. 62/805,280, filed on Feb. 13, 2019, provisional application No. 62/739,323, filed on Sep. 30, 2018.

(51) Int. Cl.
| | |
|---|---|
| *G06N 5/00* | (2006.01) |
| *G06K 9/62* | (2006.01) |
| *G06F 17/18* | (2006.01) |
| *G06N 20/10* | (2019.01) |
| *G06F 17/16* | (2006.01) |

(52) U.S. Cl.
CPC .......... *G06K 9/628* (2013.01); *G06F 17/16* (2013.01); *G06F 17/18* (2013.01); *G06K 9/6256* (2013.01); *G06K 9/6269* (2013.01); *G06N 5/003* (2013.01); *G06N 20/10* (2019.01)

(58) Field of Classification Search
CPC ...................................................... G06N 5/003
USPC ............................................................ 706/46
See application file for complete search history.

(56) References Cited

U.S. PATENT DOCUMENTS

| | | |
|---|---|---|
| 9,792,562 B1 | 10/2017 | Chen et al. |
| 10,127,477 B2 | 11/2018 | Chen et al. |
| 10,275,690 B2 | 4/2019 | Chen et al. |

(Continued)

OTHER PUBLICATIONS

Zhou et al ("Learning with Local and Global Consistency" 2004) (Year: 2004).*

(Continued)

*Primary Examiner* — Lut Wong
(74) *Attorney, Agent, or Firm* — Bell & Manning, LLC

(57) ABSTRACT

A computer trains a classification model. (A) An estimation vector is computed for each observation vector using a weight value, a mean vector, and a covariance matrix. The estimation vector includes a probability value for each class of a plurality of classes for each observation vector that indicates a likelihood that each observation vector is associated with each class. A subset of the plurality of observation vectors has a predefined class assignment. (B) The weight value is updated using the computed estimation vector. (C) The mean vector for each class is updated using the computed estimation vector. (D) The covariance matrix for each class is updated using the computed estimation vector. (E) A convergence parameter value is computed. (F) A classification model is trained by repeating (A) to (E) until the computed convergence parameter value indicates the mean vector for each class of the plurality of classes is converged.

30 Claims, 22 Drawing Sheets

(56) References Cited

U.S. PATENT DOCUMENTS

| | | |
|---|---|---|
| 10,354,204 B2 | 7/2019 | Chen et al. |
| 10,430,690 B1 | 10/2019 | Chen et al. |
| 2019/0325344 A1 | 10/2019 | Chen et al. |

OTHER PUBLICATIONS

Zhang et al ("Prototype Vector Machine for Large Scale Semi-Supervised Learning" 2009) (Year: 2009).*

Zhu et al ("Combining Active Learning and Semi-Supervised Learning Using Gaussian Fields and Harmonic Functions" 2003) (Year: 2003).*

Dong-Hyun Lee, Pseudo-Label: The Simple and Efficient Semi-Supervised Learning Method for Deep Neural Networks, ICML 2013 Workshop, Challenges in Representation Learning 2013, 6 pages.

Konyushkova et al., Learning Active Learning from Data, $31^{st}$ Conference on Neural Information Processing, 2017, pp. 1-11.

Zhou et al, Learning with Local and Global Consistency. NIPS 2004, 8 pages.

Dempster, A.P.; Laird, N.M.; Rubin, D.B. (1977). "Maximum Likelihood from Incomplete Data via the EM Algorithm". Journal of the Royal Statistical Society, Series B. 39 (1): 1-38. JSTOR 2984875. MR 0501537.

\* cited by examiner

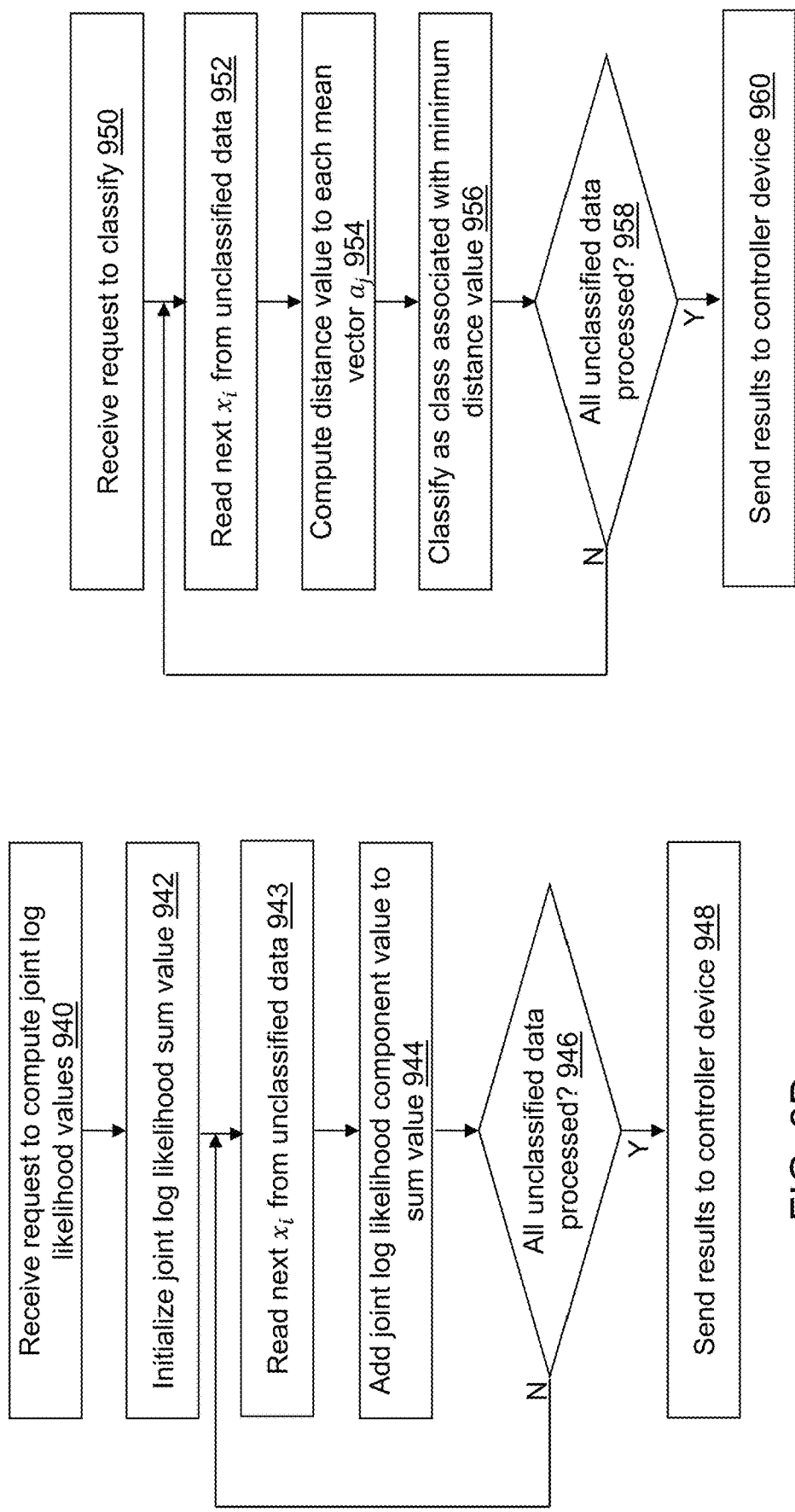

DISTRIBUTABLE CLASSIFICATION SYSTEM

CROSS-REFERENCE TO RELATED APPLICATIONS

The present application claims the benefit of and priority under 35 U.S.C. § 119(e) to U.S. Provisional Patent Application No. 62/874,732 filed on Jul. 16, 2019, the entire contents of which is hereby incorporated by reference. The present application is also a continuation-in-part of U.S. patent application Ser. No. 16/400,157 that was filed May 1, 2019, the entire contents of which is hereby incorporated by reference. U.S. patent application Ser. No. 16/400,157 claims the benefit of and priority under 35 U.S.C. § 119(e) to U.S. Provisional Patent Application No. 62/805,280 filed on Feb. 13, 2019, the entire contents of which is hereby incorporated by reference. U.S. patent application Ser. No. 16/400,157 also claims the benefit of and priority under 35 U.S.C. § 119(e) to U.S. Provisional Patent Application No. 62/739,323 filed on Sep. 30, 2018, the entire contents of which is hereby incorporated by reference.

BACKGROUND

Machine learning defines models that can be used to predict occurrence of an event, for example, from sensor data or signal data, or recognize/classify an object, for example, in an image, in text, in a web page, in voice data, in sensor data, etc. Machine learning algorithms can be classified into three categories: unsupervised learning, supervised learning, and semi-supervised learning. Unsupervised learning does not require that a target (dependent) variable y be labeled in training data to indicate occurrence or non-occurrence of the event or to recognize/classify the object. An unsupervised learning system predicts the label or classification of a target variable y in training data by defining a model that describes the hidden structure in the training data. Supervised learning requires that the target (dependent) variable y be labeled or classified in training data so that a model can be built to predict the label or classification of new unlabeled data. A supervised learning system discards observations in the training data that are not labeled. While supervised learning algorithms are typically better predictors/classifiers, labeling training data often requires a physical experiment or a statistical trial, and human labor is usually required. As a result, it may be very complex and expensive to fully label an entire training dataset. A semi-supervised learning system only requires that the target (dependent) variable y be labeled in a small portion of the training data and uses the unlabeled training data in the training dataset to define the prediction/classification (data labeling) model.

SUMMARY

In an example embodiment, a computer-readable medium is provided having stored thereon computer-readable instructions that when executed by a computing device, cause the computing device to train a classification model. A weight value is initialized for each class of a plurality of classes. A mean vector is initialized for each class of the plurality of classes. Each mean vector defines a center location vector for each class of the plurality of classes. A covariance matrix is initialized for each class of the plurality of classes. Each covariance matrix defines a shape of each class of the plurality of classes relative to a respective center location vector. (A) An estimation vector is computed for each observation vector of a plurality of observation vectors using the initialized weight value, the initialized mean vector, and the initialized covariance matrix. The estimation vector includes a probability value of a classification in each class of the plurality of classes for each respective observation vector. The probability value indicates a likelihood that a respective observation vector is associated with a respective class. A subset of the plurality of observation vectors has a predefined class assignment. (B) The weight value for each class of the plurality of classes is updated using the computed estimation vector for each observation vector of the plurality of observation vectors. (C) The mean vector for each class of the plurality of classes is updated using the computed estimation vector for each observation vector of the plurality of observation vectors. (D) The covariance matrix for each class of the plurality of classes is updated using the computed estimation vector for each observation vector of the plurality of observation vectors and the updated mean vector. (E) A convergence parameter value is computed. (F) A classification model is trained by repeating (A) to (E) with the initialized weight value replaced with the updated weight value, with the initialized mean vector replaced with the updated mean vector, and with the initialized covariance matrix replaced with the updated covariance matrix for each class of the plurality of classes until the computed convergence parameter value indicates the mean vector for each class of the plurality of classes is converged. (G) The updated mean vector and the updated covariance matrix for each class of the plurality of classes are output to define the trained classification model.

In another example embodiment, a system is provided. The system includes, but is not limited to, a processor and a computer-readable medium operably coupled to the processor. The computer-readable medium has instructions stored thereon that, when executed by the processor, cause the system to train a classification model.

In yet another example embodiment, a method of training a classification model is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 9A, 9B, 9C, 9D, and 9E depict flow diagrams illustrating examples of operations performed by the worker-thread device of FIG. 6 in accordance with an illustrative embodiment.

DETAILED DESCRIPTION

Figure 1:
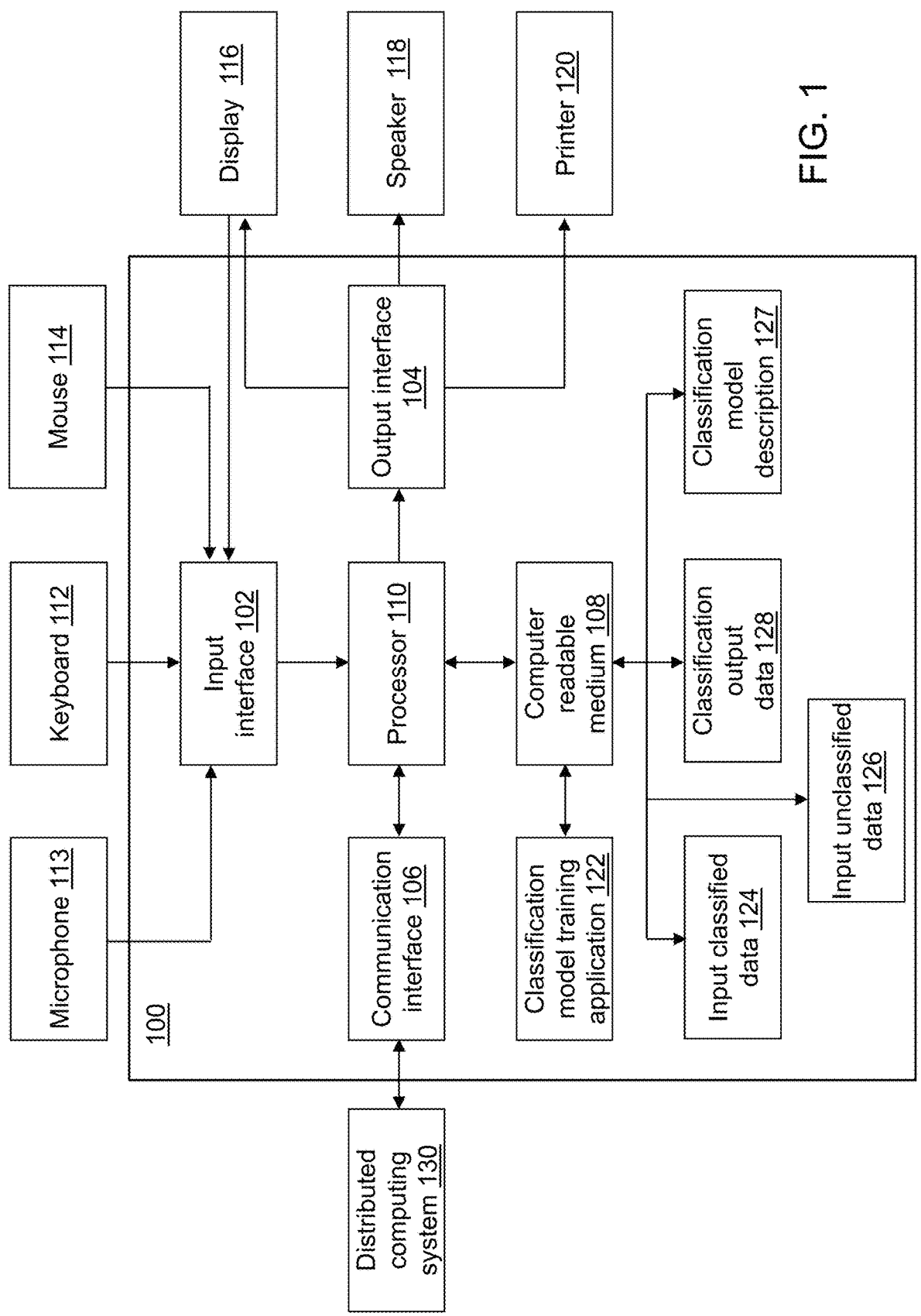
FIG. 1 depicts a block diagram of a classification model training device in accordance with an illustrative embodiment.

Referring to FIG. 1, a classification model training application 122 determines a number of classes automatically including identification of classes not included in input classified data 124. Classification model training application 122 defines classification model description 127 that can be used to classify new data. Classification model training application 122 defines classification model description 127 using a probability-based semi-supervised learning based on expectation maximization. The operations performed by classification model training application 122 can be distributed to provide increased efficiency and accuracy when large datasets are evaluated. Compared to unsupervised expectation maximization processes, classification model training application 122 incorporates a likelihood from input classified data 124 and an estimate of the mean vector $a_j$ and the covariance matrix $\Sigma_j$ from input classified data 124 to provide more accurate classification. Additionally, the mean vector $a_j$ can be used to rapidly classify new data such as that stored in second data 1124.

There are applications for classification model training application 122 in many areas such as process control and equipment health monitoring, image processing and classification, data segmentation, data analysis, etc. Classification model training application 422 provides efficient distributable parallel computing device implementations for training classification models. The results presented below demonstrate improved model accuracies.

Referring to FIG. 1, a block diagram of a classification model training device 100 is shown in accordance with an illustrative embodiment. Classification model training device 100 may include an input interface 102, an output interface 104, a communication interface 106, a non-transitory computer-readable medium 108, a processor 110, classification model training application 122, input classified data 124, input unclassified data 126, a classification model description 127, and classification output data 128. Fewer, different, and/or additional components may be incorporated into classification model training device 100.

Input interface 102 provides an interface for receiving information from the user or another device for entry into classification model training device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into classification model training device 100 or to make selections presented in a user interface displayed on display 116.

The same interface may support both input interface 102 and output interface 104. For example, display 116 comprising a touch screen provides a mechanism for user input and for presentation of output to the user. Classification model training device 100 may have one or more input interfaces that use the same or a different input interface technology. The input interface technology further may be accessible by classification model training device 100 through communication interface 106.

Output interface 104 provides an interface for outputting information for review by a user of classification model training device 100 and/or for use by another application or device. For example, output interface 104 may interface with various output technologies including, but not limited to, display 116, a speaker 118, a printer 120, etc. Classification model training device 100 may have one or more output interfaces that use the same or a different output interface technology. The output interface technology further may be accessible by classification model training device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Classification model training device 100 may have one or more communication interfaces that use the same or a different communication interface technology. For example, classification model training device 100 may support communication using an Ethernet port, a Bluetooth antenna, a telephone jack, a USB port, etc. Data and/or messages may be transferred between classification model training device 100 and another computing device of a distributed computing system 130 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Classification model training device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Classification model training device 100 also may have one or more drives that support the loading of a memory media such as a CD, DVD, an external hard drive, etc. One or more external hard drives further may be connected to classification model training device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Classification model training device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Classification model training application 122 performs operations associated with defining classification model description 127 from data stored in input classified data 124 and input unclassified data 126. Classification model description 127 may be used to predict a classification for data stored in input unclassified data 126 or in second data 1124 (shown referring to FIG. 11). Some or all of the operations described herein may be embodied in classification model training application 122. The operations may be implemented using hardware, firmware, software, or any combination of these methods.

Referring to the example embodiment of FIG. 1, classification model training application 122 is implemented in software (comprised of computer-readable and/or computer-executable instructions) stored in computer-readable medium 108 and accessible by processor 110 for execution of the instructions that embody the operations of classification model training application 122. Classification model training application 122 may be written using one or more programming languages, assembly languages, scripting languages, etc. Classification model training application 122 may be integrated with other analytic tools. As an example, classification model training application 122 may be part of an integrated data analytics software application and/or software architecture such as that offered by SAS Institute Inc. of Cary, N.C., USA. Merely for illustration, classification model training application 122 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Classification model training application 122 may be implemented as a Web application. For example, classification model training application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input classified data 124 and input unclassified data 126 may include, for example, a plurality of rows and a plurality of columns. The plurality of rows may be referred to as observation vectors or records (observations), and the columns may be referred to as variables. In an alternative embodiment, input classified data 124 and input unclassified data 126 may be transposed. The plurality of variables define a vector $x_i$ for each observation vector i=1, 2, ..., N, where N is a number of the observation vectors included in input classified data 124 and input unclassified data 126. Input classified data 124 includes a target variable value $y_i$ for each observation vector that indicates a label or class or other characteristic defined for the respective observation vector $x_i$ for i=1, 2, ..., n, where n is a number of the observation vectors included in input classified data 124. Input classified data 124 includes observation vectors that have been labeled or classified, for example, by a human or other machine learning labeling process. For example, the label or classification may indicate a class for the observation vector or otherwise indicate an identification of a characteristic of the observation vector. For example, a $y_i$ value may indicate the label determined for the observation vector $x_i$ such as what the observation vector $x_i$ in the form of text means, what the observation vector $x_i$ in the form of image data does or does not represent (i.e., text, a medical condition, an equipment failure, an intrusion, a terrain feature, etc.), what the observation vector $x_i$ in the form of sensor signal data does or does not represent (i.e., voice, speech, an equipment failure, an intrusion, a terrain feature, etc.), etc. Input unclassified data 126 includes observation vectors $x_i$ that have not been labeled such that the $y_i$ value has not been determined though a value such as zero may be included in a column associated with the $y_i$ values. Input classified data 124 and input unclassified data 126 may be stored in a single database, file, etc. where the $y_i$ value may indicate whether the associated observation vector has been labeled or classified. For example, a $y_i$ value of zero may indicate an unclassified observation vector though in other embodiments, the $y_i$ value of zero may indicate a label, and therefor, a classified observation vector.

Input classified data 124 and input unclassified data 126 may include additional variables that are not included in the plurality of variables. One or more variables of the plurality of variables may describe a characteristic of a physical object. For example, if input classified data 124 and input unclassified data 126 include data related to operation of a vehicle, the variables may include a type of vehicle, an oil pressure, a speed, a gear indicator, a gas tank level, a tire pressure for each tire, an engine temperature, a radiator level, etc.

A sensor may measure a physical quantity in an environment to which the sensor is associated and generate a corresponding measurement datum that may be associated with a time that the measurement datum is generated. Illustrative sensors include a microphone, an infrared sensor, a radar, a pressure sensor, a temperature sensor, a position or location sensor, a voltage sensor, a current sensor, a frequency sensor, a humidity sensor, a dewpoint sensor, a camera, a computed tomography machine, a magnetic resonance imaging machine, an x-ray machine, an ultrasound machine, etc. that may be mounted to various components used as part of a system. For example, input classified data 124 and input unclassified data 126 may include image data captured by medical imaging equipment (i.e., computed tomography image, magnetic resonance image, x-ray image, ultrasound image, etc.) of a body part of a living thing. A subset of the image data is labeled and captured in input classified data 124, for example, as either indicating existence of a medical condition or non-existence of the medical condition. Input classified data 124 and input unclassified data 126 may include a reference to image data that may be stored, for example, in an image file or in a video file, and the existence/non-existence label associated with each image file or video file. Input classified data 124 and input unclassified data 126 may include a plurality of such references. The existence/non-existence label or other label may be defined by a clinician or expert in the field to which data stored in input classified data 124 relates.

In data science, engineering, and statistical applications, data often consists of multiple measurements (across sensors, characteristics, responses, etc.) collected across multiple time instances (patients, test subjects, etc.). These measurements may be collected in input classified data 124 and input unclassified data 126 for analysis and processing or streamed to classification model training device 100 as it is generated. Input classified data 124 and input unclassified data 126 may include data captured as a function of time for one or more physical objects. The data stored in input classified data 124 and input unclassified data 126 may be captured at different time points periodically, intermittently, when an event occurs, etc. Input classified data 124 and input unclassified data 126 may include data captured at a high data rate such as 200 or more observation vectors per second for one or more physical objects. One or more columns of input classified data 124 and input unclassified data 126 may include a time and/or date value. Input classified data 124 and input unclassified data 126 may include data captured under normal and abnormal operating conditions of the physical object.

The data stored in input classified data 124 and input unclassified data 126 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in input classified data 124 and input unclassified data 126 may be generated as part of the Internet of Things (IoT), where things (e.g., machines, devices, phones, sensors) can be connected to networks and the data from these things collected and processed within the things and/or external to the things before being stored in input classified data 124 and input unclassified data 126. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input classified data 124 and input unclassified data 126.

The data stored in input classified data 124 and input unclassified data 126 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Input classified data 124 and input unclassified data 126 may be stored on computer-readable medium 108 or on one or more computer-readable media of distributed computing system 130 and accessed by classification model training device 100 using communication interface 106, input interface 102, and/or output interface 104. Input classified data 124 and input unclassified data 126 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input classified data 124 and input unclassified data 126 may be stored using various data structures as known to those skilled in the art including one or more files of a file system, a relational database, one or more tables of a system of tables, a structured query language database, etc. on classification model training device 100 or on distributed computing system 130. Classification model training device 100 may coordinate access to input classified data 124 and input unclassified data 126 that is distributed across distributed computing system 130 that may include one or more computing devices. For example, input classified data 124 and input unclassified data 126 may be stored in a cube distributed across a grid of computers as understood by a person of skill in the art. As another example, input classified data 124 and input unclassified data 126 may be stored in a multi-node Hadoop® class. For instance, Apache™ Hadoop® is an open-source software framework for distributed computing supported by the Apache Software Foundation. As another example, input classified data 124 and input unclassified data 126 may be stored in a cloud of computers and accessed using cloud computing technologies, as understood by a person of skill in the art. The SAS® LASR™ Analytic Server may be used as an analytic platform to enable multiple users to concurrently access data stored in input classified data 124 and input unclassified data 126. The SAS Viya open, cloud-ready, in-memory architecture also may be used as an analytic platform to enable multiple users to concurrently access data stored in input classified data 124 and input unclassified data 126. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2A:
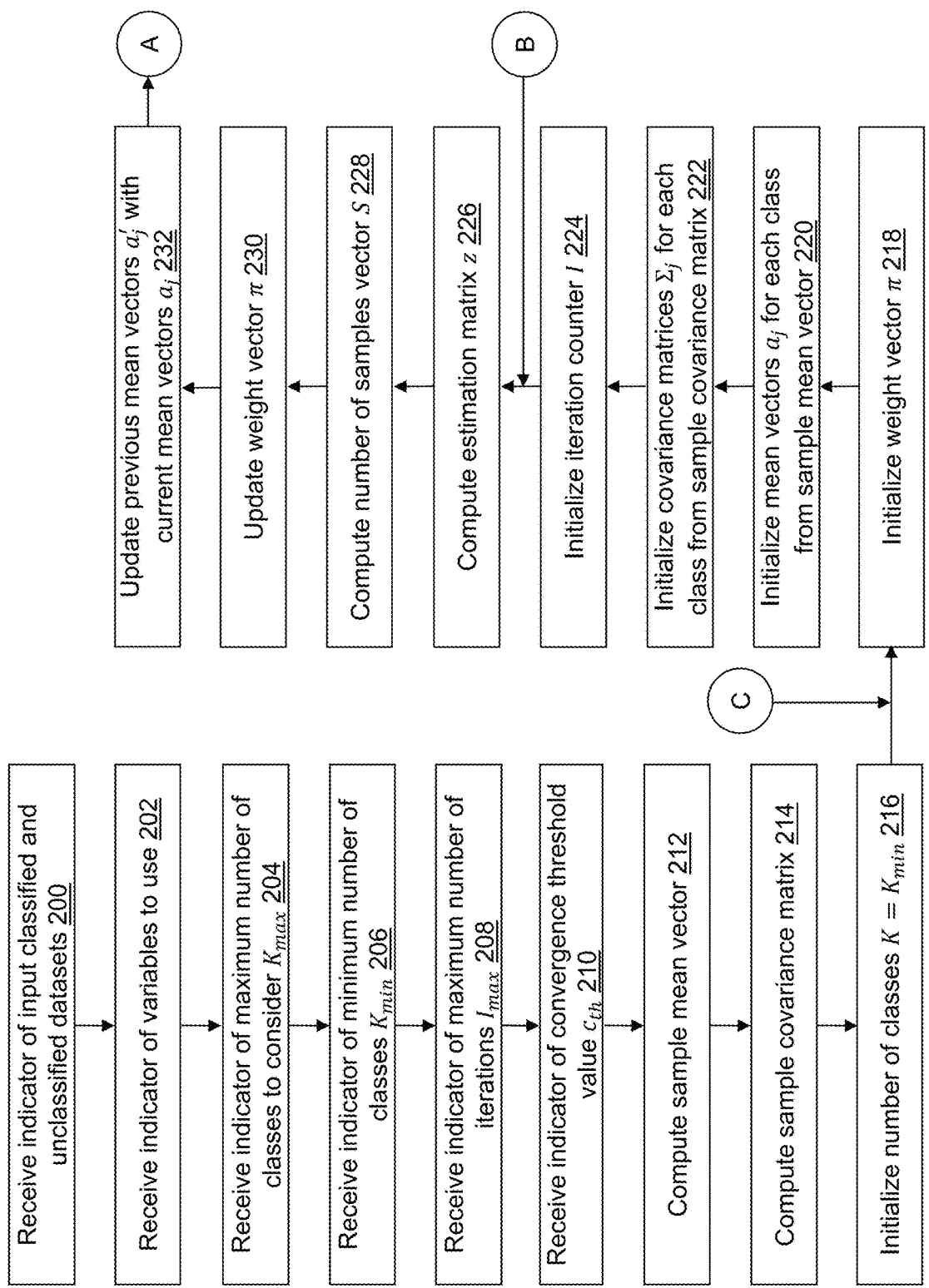
FIGS. 2A and 2B depict a flow diagram illustrating examples of operations performed by a classification model training application of the classification model training device of FIG. 1 in accordance with an illustrative embodiment.
Figure 2B:
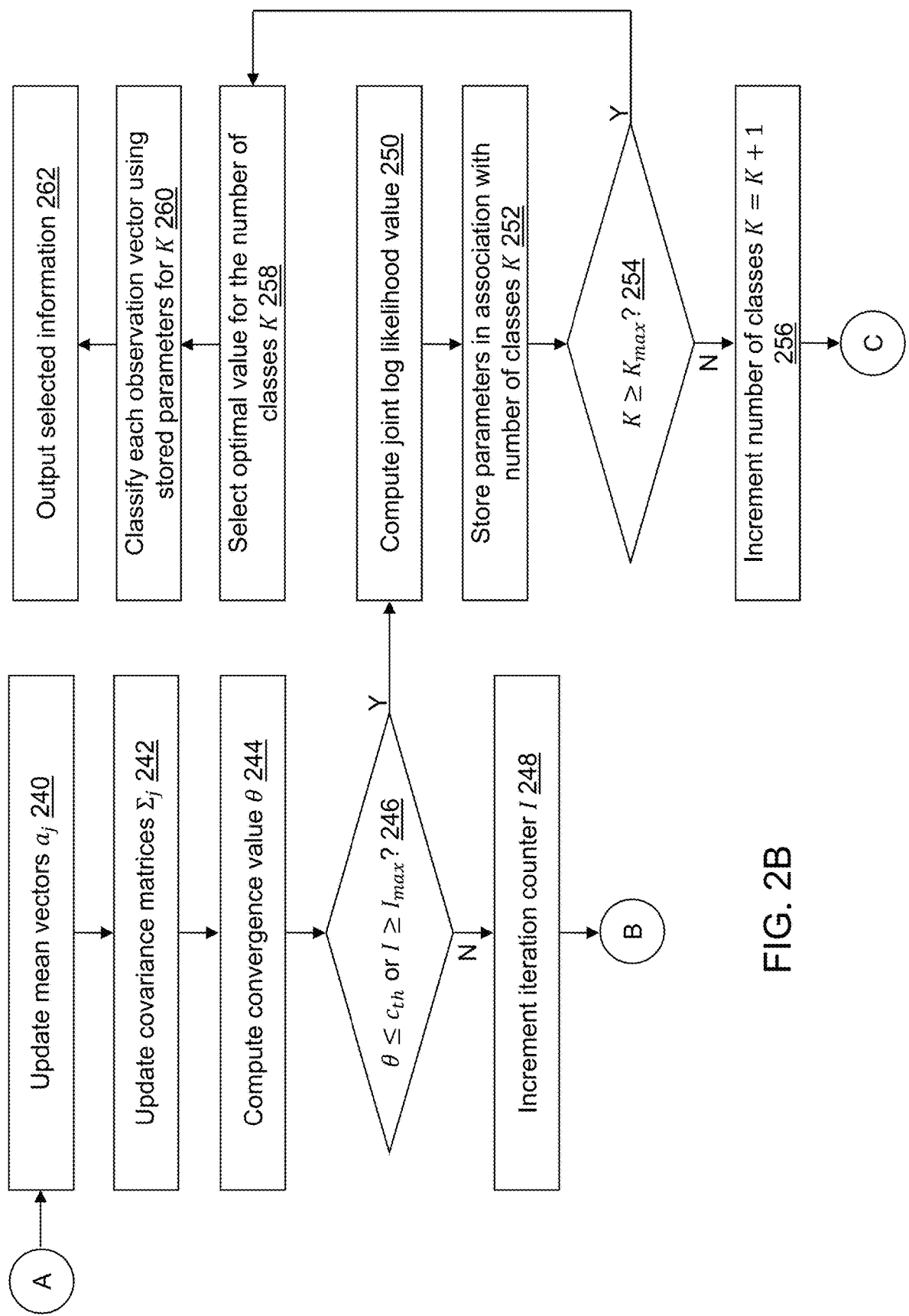

Referring to FIGS. 2A and 2B, example operations associated with classification model training application 122 are described when input classified data 124 and input unclassified data 126 are stored on classification model training device 100 and accessed by a single thread of classification model training device 100. Additional, fewer, or different operations may be performed depending on the embodiment of classification model training application 122. The order of presentation of the operations of FIGS. 2A and 2B is not intended to be limiting. Some of the operations may not be performed in some embodiments. Although some of the operational flows are presented in sequence, the various operations may be performed in various repetitions and/or in other orders than those that are illustrated. For example, a user may execute classification model training application 122, which causes presentation of a first user interface window, which may include a plurality of menus and selectors such as drop-down menus, buttons, text boxes, hyperlinks, etc. associated with classification model training application 122 as understood by a person of skill in the art. The plurality of menus and selectors may be accessed in various orders. An indicator may indicate one or more user trainings from a user interface, one or more data entries into a data field of the user interface, one or more data items read from computer-readable medium 108 or otherwise defined with one or more default values, etc. that are received as an input by classification model training application 122.

Referring to FIG. 2A, in an operation 200, a first indicator may be received that indicates input classified data 124 and input unclassified data 126. For example, the first indicator indicates a location and a name of input classified data 124 and input unclassified data 126 that may be stored together or separately though they are described herein as separate for simplicity. As an example, the first indicator may be received by classification model training application 122 after selection from a user interface window or after entry by a user into a user interface window. In an alternative embodiment, input classified data 124 and input unclassified data 126 may not be selectable. For example, a most recently created dataset may be used automatically.

In an operation 202, a second indicator may be received that indicates the plurality of variables to use from input classified data 124 and input unclassified data 126 to define observation vectors. For example, the second indicator may indicate one or more column numbers or one or more column names. As another option, all of the columns of input classified data 124 and input unclassified data 126 except a first or a last column may be assumed to be the plurality of variables. The plurality of variables are the variables that define each observation vector $x_i$. A number of the plurality of variables may be indicated by $N_v$. The second indicator may further indicate a column number or a column name that stores the value for $y_i$ in input classified data 124 and/or input unclassified data 126. As another option, the first or the last column may be assumed to include the value for $y_i$.

In an operation 204, a third indicator of a maximum number of classes to consider $K_{max}$ may be received. In an alternative embodiment, the third indicator may not be received. For example, a default value may be stored, for example, in computer-readable medium 108 and used automatically. In another alternative embodiment, the value of the maximum number of classes to consider $K_{max}$ may not be selectable. Instead, a fixed, predefined value may be used. For illustration, a default value of the maximum number of classes to consider $K_{max}$ may be 100 though other values may be used.

In an operation 206, a fourth indicator of a minimum number of classes to consider $K_{min}$ may be received. In an alternative embodiment, the fourth indicator may not be received. For example, a default value may be stored, for example, in computer-readable medium 108 and used automatically. In another alternative embodiment, the value of the minimum number of classes to consider $K_{min}$ may not be selectable. Instead, a fixed, predefined value may be used. For illustration, a default value of the minimum number of classes to consider $K_{min}$ may be 2 though other values may be used. As another option, the minimum number of classes to consider $K_{min}$ may be determined by computing a unique number of values for $y_i$ in input classified data 124.

In an operation 208, a fifth indicator of a maximum number of iterations $I_{max}$ may be received. In an alternative embodiment, the fifth indicator may not be received. For example, a default value may be stored, for example, in computer-readable medium 108 and used automatically. In another alternative embodiment, the value of the maximum number of iterations $I_{max}$ may not be selectable. Instead, a fixed, predefined value may be used. For illustration, a default value of the maximum number of iterations $I_{max}$ may be 100 though other values may be used.

In an operation 210, a sixth indicator of a convergence threshold value $c_{th}$ may be received. In an alternative embodiment, the sixth indicator may not be received. For example, a default value may be stored, for example, in computer-readable medium 108 and used automatically. In another alternative embodiment, the value of the convergence threshold value $c_{th}$ may not be selectable. Instead, a fixed, predefined value may be used. For illustration, a default value of the convergence threshold value $c_{th}$ may be 0.01 though other values may be used.

In an operation 212, a sample mean vector m may be computed using $$m_j = \frac{1}{N}\sum_{i=1}^{N} x_{i,j}, \quad j = 1, 2, \ldots, N_v,$$

where $x_{i,j}$ is a variable value for a $j^{th}$ variable of the $i^{th}$ observation vector read from input classified data 124 and input unclassified data 126, $m_j$ is the mean value of the $j^{th}$ variable, and N is the number of the plurality of observation vectors read from input classified data 124 and input unclassified data 126.

In an operation 214, a sample covariance matrix C is computed using $$C = \frac{1}{N-1} \sum_{i=1}^{N} (x_i - m)(x_i - m)^\top,$$

where T indicates a transpose of the vector, and $x_i$ is the $i^{th}$ observation vector read from input classified data 124 and input unclassified data 126.

In an operation 216, a number of classes K is initialized, for example, as $K=K_{min}$.

In an operation 218, a weight vector $\pi$ is initialized that includes a value for each class. For illustration, the weight vector $\pi$ may be initialized using random draws from a multinomial distribution such that each weight value sums to one or $\Sigma_{j=1}^{K} \pi_j = 1$. As another illustration, the weight vector $\pi$ may be initialized using $\pi_j = 1/K$, $j=1, 2, \ldots, K$.

In an operation 220, a mean vector $a_j$ is initialized for each class using the sample mean vector m such that $a_j = m$, $j=1, 2, \ldots, K$.

In an operation 222, a covariance matrix $\Sigma_j$ is initialized for each class using the sample covariance matrix C such that $\Sigma_j = C$, $j=1, 2, \ldots, K$.

In an operation 224, an iteration counter I is initialized, for example, as I=1.

In an operation 226, an estimation matrix z is computed, for example, using $$W = \sum_{j=1}^{K} \frac{\pi_j e^{\left(-0.5\|x_i - a_j\|_{\Sigma_j}^2\right)}}{|\Sigma_j|^{0.5}},$$

$$z_{i,j} = \frac{\pi_j e^{\left(-0.5\|x_i - a_j\|_{\Sigma_j}^2\right)}}{W|\Sigma_j|^{0.5}}, \quad j = 1, 2, \ldots, K, \text{ and}$$

$$i = n+1, n+2, \ldots, N.$$

The estimation matrix z defines a probability value for each class of the number of classes K for each observation vector of the number of observation vectors N included in input classified data 124 and in input unclassified data 126. The probability value indicates a likelihood that a respective observation vector $x_i$ is associated with a respective class.

The estimation vector $z_i$, $i=1, 2, \ldots, n$ for the observation vectors included in input classified data 124 has a zero value for all classes $j=1, 2, \ldots, K$, except the class index $l_i$ associated with the target variable value $y_i$ of the respective observation vector, which has a value of one. The portion of the estimation matrix z defined by observation vectors included in input classified data 124 does not change once defined on a first iteration of operation 226.

In an operation 228, a number of samples vector S is computed, for example, using $S_j = \Sigma_{i=1}^{N} z_{i,j}$, $j=1, 2, \ldots, K$. Each number of samples value $S_j$ estimates a number of samples that belong to each class j of the number of classes K.

In an operation 230, the weight vector $\pi$ is updated, for example, using $$\pi_j = \frac{S_j}{N}, \quad j = 1, 2, \ldots, K.$$

Each weight value $\pi_j$ defines a weight for each respective class j of the number of classes K.

In an operation 232, mean previous vectors $a_j'$ are updated with mean vector $a_j$, for example, using $a_j' = a_j$, $j=1, 2, \ldots, K$, and processing continues in operation 240 shown referring to FIG. 2B.

In an operation 240, the mean vector $a_1$ for each class is updated, for example, using $$a_j = \frac{1}{S_j} \left( \sum_{i=n+1}^{N} z_{i,j} x_i + \sum_{i=1}^{n} z_{i,j} a_j' \right), \quad j = 1, 2, \ldots, K.$$

The mean vector $a_j'$ on a previous iteration is used for each observation vector included in input classified data 124 instead of the observation vector $x_i$. Only the mean vector $a_j'$ for the class defined by the target variable value $y_i$ of the respective observation vector included in input classified data 124 is included in the summation because the remaining values of $z_{i,j}$ are zero. The mean vector $a_j$ defines a center location vector for each respective class j of the number of classes K.

In an operation 242, the covariance matrix $\Sigma_j$ for each class is updated, for example, using $$\sum_j = \frac{1}{S_j} \left( \sum_{i=1}^{N} z_{i,j} (x_i - a_j)(x_i - a_j)^\top \right), \quad j = 1, 2, \ldots, K.$$

The covariance matrix $\Sigma_j$ defines a shape of each respective class j of the number of classes K relative to the center location vector.

In an operation 244, a convergence value $\theta$ is computed, for example, using $\theta = \Sigma_{j=1}^{K} \|a_j - a_j'\|$. The convergence value $\theta$ is a sum of a difference between the current mean vectors $a_j$ and the previous mean vectors $a_j'$ for each class of the number of classes K.

In an operation 246, a determination is made concerning whether convergence has been achieved or the maximum number of iterations have been performed. If $\theta \leq c_{th}$ or $I \geq I_{max}$, processing continues in an operation 250. If $\theta > c_{th}$ and $I < I_{max}$, processing continues in an operation 248.

In operation 248, the iteration counter I is incremented, for example, as I=I+1, and processing continues in operation 226.

In operation 250, a joint log likelihood value $W_{ll}$ is computed, for example, using $W_{ll} = \Sigma_{i=1}^{n} \log \pi_{l_i} G(a_{l_i}, \Sigma_{l_i}) + \Sigma_{i=n+1}^{N} \Sigma_{j=1}^{K} z_{i,j} \log \pi_j G(x_i, \Sigma_j)$, where $l_i$ indicates the index to the class defined by the target variable value $y_i$ of the respective observation vector $x_i$ included in input classified data 124, G(m, σ) indicates a Gaussian random vector selected from a Gaussian distribution using a mean vector m and a covariance matrix σ as parameters.

In an operation 252, $W_{ll}$, the mean vector $a_j$ for each class, and the covariance matrix $\Sigma_j$ for each class are stored in association with the number of classes K. Additional information may be stored as well.

In an operation 254, a determination is made concerning whether each number of classes has been evaluated. If $K \geq K_{max}$, processing continues in an operation 258. If $K < K_{max}$, processing continues in an operation 256.

In operation 256, the number of classes K is incremented, for example, as K=K+1, and processing continues in operation 218.

In operation 258, an optimal value for the number of classes $K_o$ is selected based on joint log likelihood value $W_{ll}$ computed and stored in association with each number of classes from $K_{min}$ to $K_{max}$. For example, the optimal value for the number of classes $K_o$ is selected as the number of classes associated with a maximum value of the joint log likelihood value $W_{ll}$. The optimal value for the number of classes $K_o$ may be greater than $K_{min}$, which was the number of classes identified in input classified data 124. As a result, classification model training application 122 can identify new classes in input unclassified data 126.

In an operation 260, a class is identified for each observation vector $x_i$ included in input unclassified data 126 by computing a distance value from a respective observation vector to each class center location vector as defined by the mean vector $a_j$ for each class defined and stored in association with the optimal value for the number of classes $K_o$. For illustration, $k_i = j$ having min $D(x_i, a_j)$, $j=1, 2, \ldots, K_o$, and $i=n+1, n+2, \ldots, N$, where $D(x_i, a_j)$ is the distance value. For example, $D(x_i, a_j)$ may indicate a Euclidian distance computation. The identified class for each observation vector $x_i$, $i=n+1, n+2, \ldots, N$ may be stored in classification output data 128 possibly with the respective observation vector $x_i$.

In an operation 262, the mean vector $a_1$ and the covariance matrix $\Sigma_j$ computed for each class $j=1, 2, \ldots, K_o$ of the optimal number of classes $K_o$ are output to define a trained classification model. For example, the mean vector $a_j$ and the covariance matrix $\Sigma_j$ computed for each class $j=1, 2, \ldots, K_o$ of the optimal number of classes $K_o$ may be output by storing them to classification model description 127, by presenting them on display 116, for example, in a graph, by sending to another computing device of distributed computing system 130, etc. Additional information that may be output are a number of observation vectors classified into each class $j=1, 2, \ldots, K_o$, a neighbor class of each class whose mean vector $a_j$ is closest to the mean vector $a_j$, the weight vector π, etc.

Compared to unsupervised expectation maximization processes, classification model training application 122 incorporates a likelihood from input classified data 124 and an estimate of the mean vector $a_j$ and the covariance matrix $\Sigma_j$ from input classified data 124 to provide more accurate classification. Additionally, the mean vector $a_j$ can be used to rapidly classify new data such as that stored in second data 1124.

Figure 3:
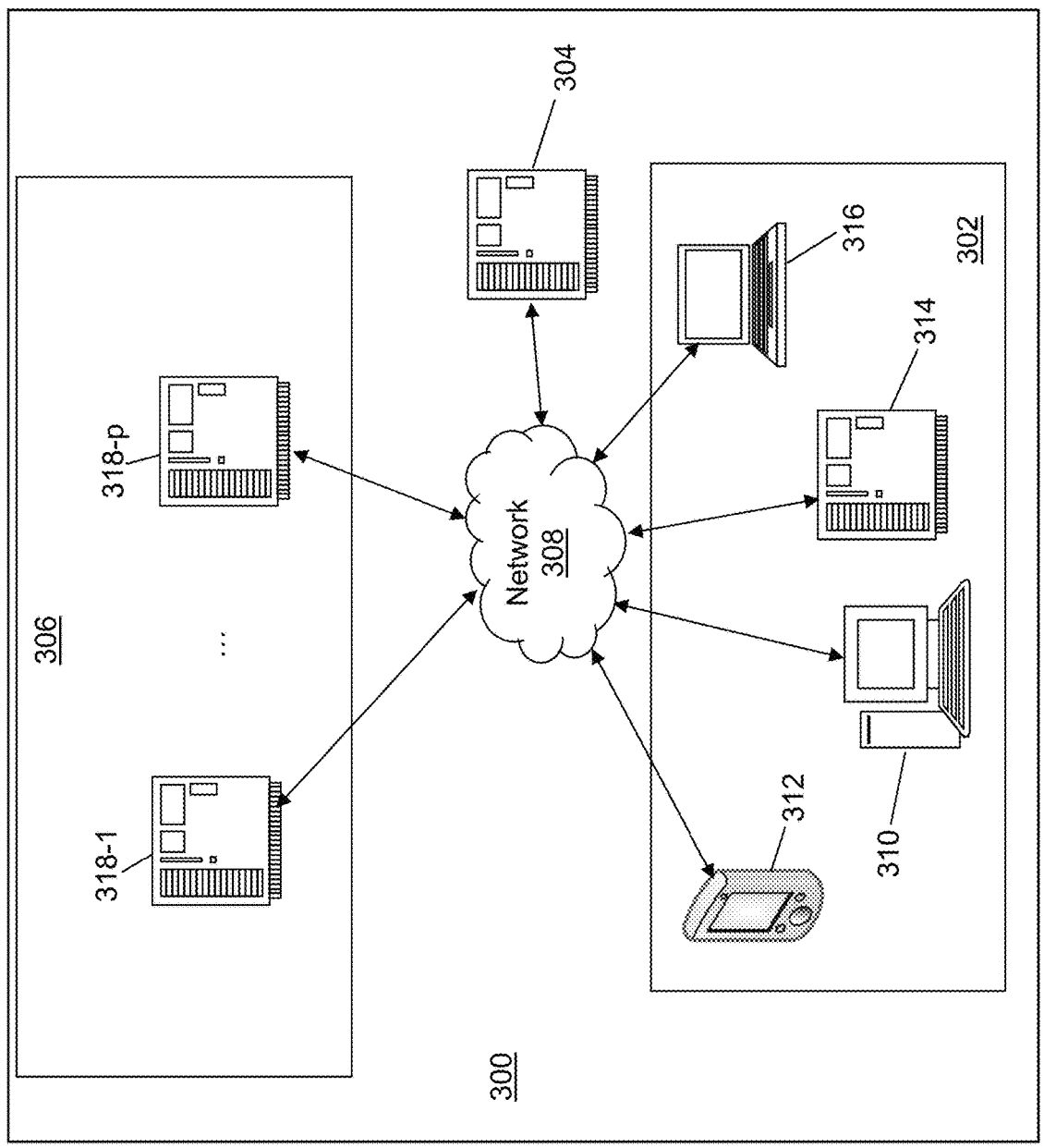
FIG. 3 depicts a block diagram of a classification model training system in accordance with an illustrative embodiment.

Referring to FIG. 3, a block diagram of a classification model training system 300 is shown in accordance with an illustrative embodiment. In an illustrative embodiment, classification model training system 300 may include a user system 302, a controller device 304, a worker system 306, and a network 308. Each of user system 302, controller device 304, and worker system 306 may be composed of zero or more discrete computing devices in communication through network 308. User system 302 and controller device 304 may be integrated into a single computing device capable of executing multiple threads with no worker devices of worker system 306.

Network 308 may include one or more networks of the same or different types. Network 308 can be any type of wired and/or wireless public or private network including a cellular network, a local area network, a wide area network such as the Internet or the World Wide Web, etc. Network 308 further may comprise sub-networks and consist of any number of communication devices.

The one or more computing devices of user system 302 may include computing devices of any form factor such as a desktop 310, a smart phone 312, a server computer 314, a laptop 316, a personal digital assistant, an integrated messaging device, a tablet computer, etc. User system 302 can include any number and any combination of form factors of computing devices that may be organized into subnets. In general, a "server" computer may include faster processors, additional processors, more disk memory, and/or more random access memory (RAM) than another computer form factor and support multi-threading as understood by a person of skill in the art. The computing devices of user system 302 may send and receive signals through network 308 to/from another of the one or more computing devices of user system 302 and/or to/from controller device 304. The one or more computing devices of user system 302 may communicate using various transmission media that may be wired and/or wireless as understood by those skilled in the art. The one or more computing devices of user system 302 may be geographically dispersed from each other and/or co-located.

Figure 4:
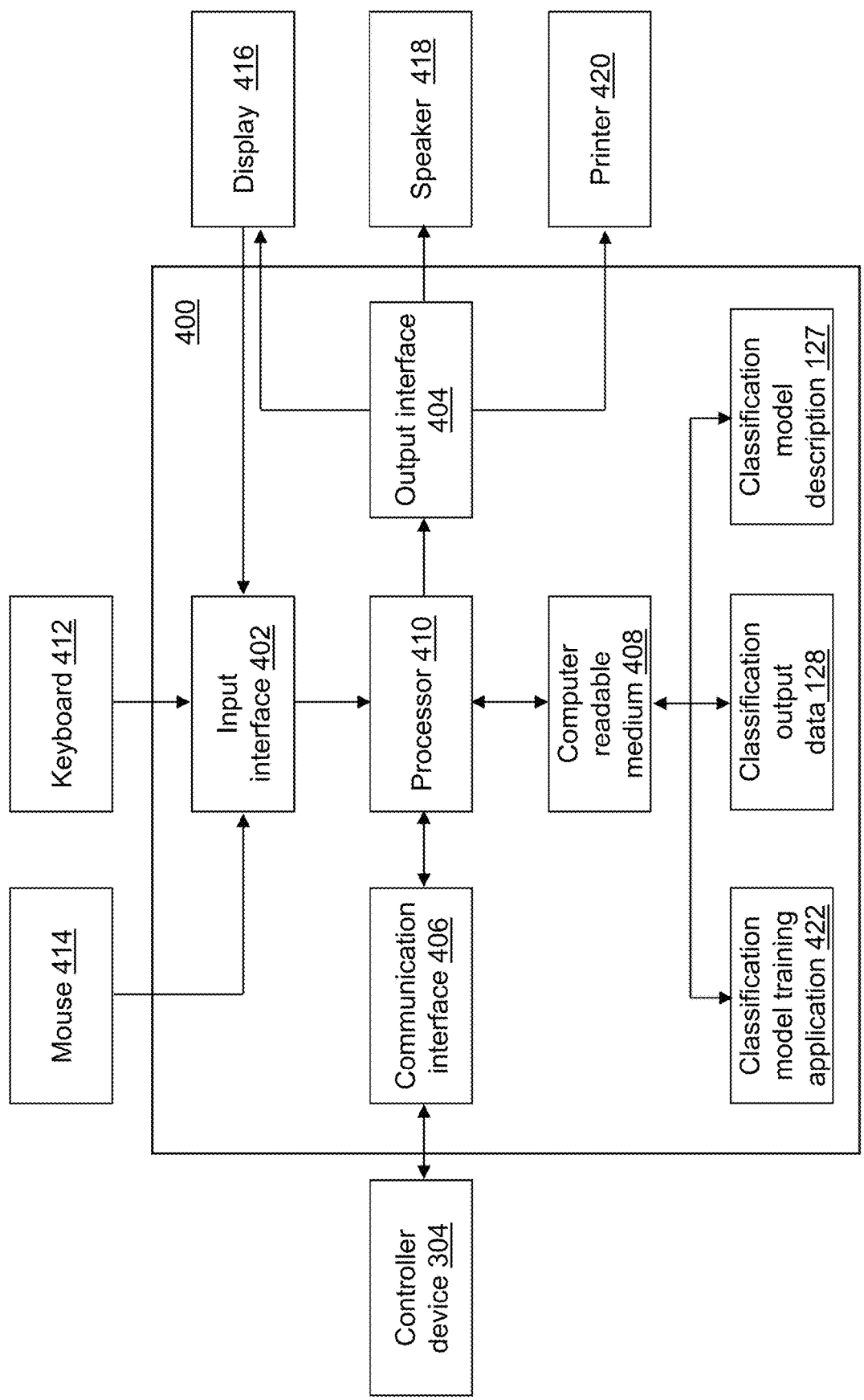
FIG. 4 depicts a block diagram of a user device of the classification model training system of FIG. 3 in accordance with an illustrative embodiment.

For illustration, referring to FIG. 4, a block diagram of a user device 400 is shown in accordance with an example embodiment. User device 400 is an example computing device of user system 302. For example, each of desktop 310, smart phone 312, server computer 314, and laptop 316 may be an instance of user device 400. User device 400 may include a second input interface 402, a second output interface 404, a second communication interface 406, a second computer-readable medium 408, a second processor 410, a classification model training application 422, classification model description 127, and classification output data 128. Each computing device of user system 302 may be executing classification model training application 422 of the same or different type.

Referring again to FIG. 3, controller device 304 can include any form factor of computing device. For illustration, FIG. 3 represents controller device 304 as a server computer. Controller device 304 may send and receive signals through network 308 to/from user system 302 and/or to/from worker system 306. Controller device 304 may communicate using various transmission media that may be wired and/or wireless as understood by those skilled in the art. Controller device 304 may be implemented on a plurality of computing devices of the same or different type. Classification model training system 300 further may include a plurality of controller devices.

Figure 5:
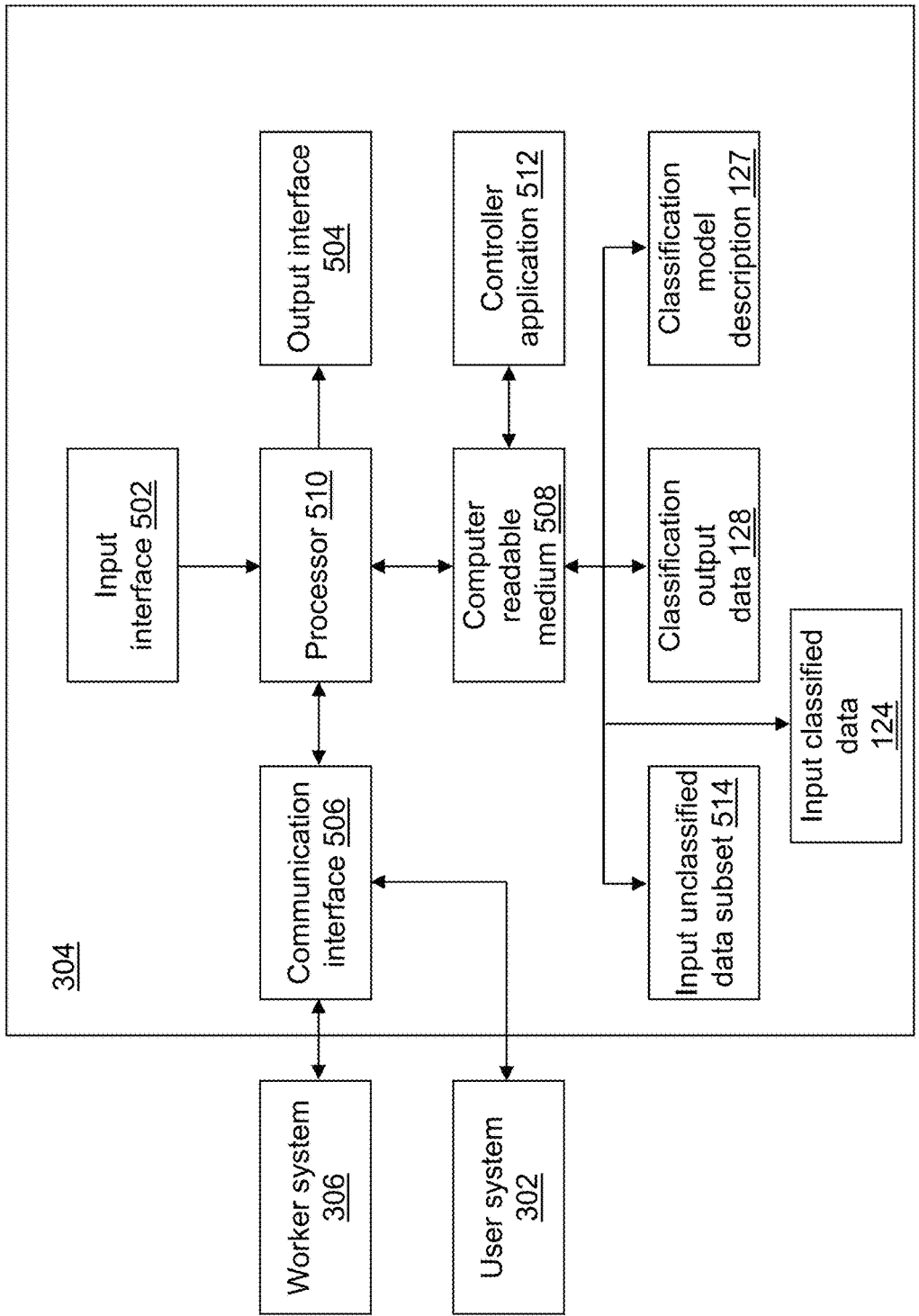
FIG. 5 depicts a block diagram of a controller device of the classification model training system of FIG. 3 in accordance with an illustrative embodiment.

For illustration, referring to FIG. 5, a block diagram of controller device 304 is shown in accordance with an illustrative embodiment. Controller device 304 may include a third input interface 502, a third output interface 504, a third communication interface 506, a third computer-readable medium 508, a third processor 510, a controller application 512, input classified data 124, an input unclassified data subset 514, classification output data 128, and classification model description 127. Controller device 304 may execute controller application 512 that creates classification model description 127. Input unclassified data subset 514 may include zero or more including all of the observation vectors of input unclassified data 126.

Referring again to FIG. 3, the one or more computing devices of worker system 306 may include computers of any form factor such as a desktop, a server, a laptop, etc. For example, in the illustrative embodiment, worker system 306 includes a first server computer 318-*a*, . . . , and an nth server computer 318-*n*. Each server computer may support use of a plurality of threads. The computing devices of worker system 306 may send and receive signals through network 308 to/from controller device 304 and/or to/from another computing device of worker system 306. The one or more computing devices of worker system 306 may be geographically dispersed from each other and/or co-located. The one or more computing devices of worker system 306 may communicate using various transmission media that may be wired and/or wireless as understood by those skilled in the art.

Figure 6:
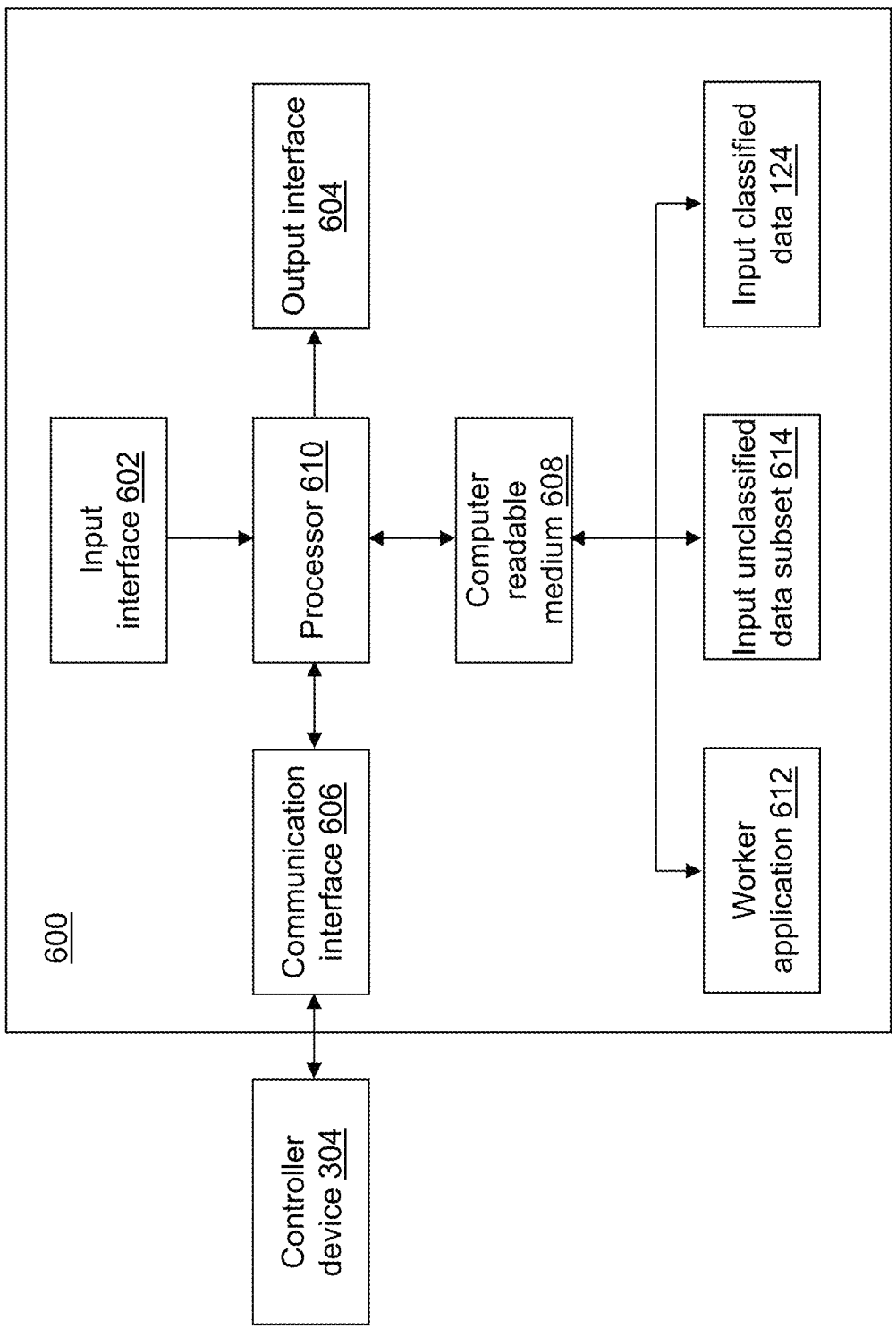
FIG. 6 depicts a block diagram of a worker-thread device of the classification model training system of FIG. 3 in accordance with an illustrative embodiment.

For illustration, referring to FIG. 6, a block diagram of a worker device 600 is shown in accordance with an example embodiment. Worker device 600 is an example computing device of worker system 306. For example, each of first server computer 318-*a*, . . . , and nth server computer 318-*n* may be an instance of worker device 600. Worker device 600 may include a fourth input interface 602, a fourth output interface 604, a fourth communication interface 606, a fourth computer-readable medium 608, a fourth processor 610, a worker application 612, input classified data 124, and an input unclassified data subset 614. Input unclassified data 126 may be stored in input unclassified data subset 614 distributed across each worker device 600 of worker system 306. A portion of input unclassified data 126 may also be stored in input unclassified data subset 514 stored on controller device 304.

Referring again to FIG. 4, each user device 400 of user system 302 may include the same or different components and combinations of components. Fewer, different, and additional components may be incorporated into user device 400. Second input interface 402 provides the same or similar functionality as that described with reference to input interface 102 of classification model training device 100 though referring to user device 400. Second output interface 404 provides the same or similar functionality as that described with reference to output interface 104 of classification model training device 100 though referring to user device 400. Second communication interface 406 provides the same or similar functionality as that described with reference to communication interface 106 of classification model training device 100 though referring to user device 400. Data and messages may be transferred between controller device 304 and user device 400 using second communication interface 406. Second computer-readable medium 408 provides the same or similar functionality as that described with reference to computer-readable medium 108 of classification model training device 100 though referring to user device 400. Second processor 410 provides the same or similar functionality as that described with reference to processor 110 of classification model training device 100 though referring to user device 400.

Classification model training application 422 performs operations associated with training a classification model. The operations may be implemented using hardware, firmware, software, or any combination of these methods. Referring to the example embodiment of FIG. 4, classification model training application 422 is implemented in software (comprised of computer-readable and/or computer-executable instructions) stored in second computer-readable medium 408 and accessible by second processor 410 for execution of the instructions that embody the operations of classification model training application 422. Classification model training application 422 may be written using one or more programming languages, assembly languages, scripting languages, etc.

Classification model training application 422 may be implemented as a Web application. Classification model training application 422 may be integrated with other analytic tools. As an example, classification model training application 422 may be part of an integrated data analytics software application and/or software architecture such as that offered by SAS Institute Inc. of Cary, N.C., USA. For example, classification model training application 422 may be part of SAS® Enterprise Miner™ developed and provided by SAS Institute Inc. of Cary, N.C., USA that may be used to create highly accurate classification and descriptive models based on analysis of vast amounts of data from across an enterprise. Merely for further illustration, classification model training application 422 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS® Viya™, SAS In-Memory Statistics for Hadoop®, all of which are developed and provided by SAS Institute Inc. of Cary, N.C., USA. Data mining is applicable in a wide variety of industries.

Referring to FIG. 5, fewer, different, or additional components may be incorporated into controller device 304. Third input interface 502 provides the same or similar functionality as that described with reference to input interface 102 of classification model training device 100 though referring to controller device 304. Third output interface 504 provides the same or similar functionality as that described with reference to output interface 104 of classification model training device 100 though referring to controller device 304. Third communication interface 506 provides the same or similar functionality as that described with reference to communication interface 106 of classification model training device 100 though referring to controller device 304. Data and messages may be transferred between controller device 304 and user device 400 and/or worker device 600 using third communication interface 506. Third computer-readable medium 508 provides the same or similar functionality as that described with reference to computer-readable medium 108 of classification model training device 100 though referring to controller device 304. Third processor 510 provides the same or similar functionality as that described with reference to processor 110 of classification model training device 100 though referring to controller device 304.

Controller application 512 performs operations associated with training the classification model based on inputs provided from user device 400 optionally using the computing devices of worker system 306. The operations may be implemented using hardware, firmware, software, or any combination of these methods. Referring to the example embodiment of FIG. 5, controller application 512 is implemented in software (comprised of computer-readable and/or computer-executable instructions) stored in third computer-readable medium 508 and accessible by third processor 510 for execution of the instructions that embody the operations of controller application 512. Controller application 512 may be written using one or more programming languages, assembly languages, scripting languages, etc. Controller application 512 may be implemented as a Web application.

Controller application 512 may be integrated with other analytic tools. As an example, controller application 512 may be part of an integrated data analytics software application and/or software architecture such as that offered by SAS Institute Inc. of Cary, N.C., USA. For example, controller application 512 may be part of SAS® Enterprise Miner™ developed and provided by SAS Institute Inc. of Cary, N.C., USA. Merely for further illustration, controller application 512 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS® Viya™, SAS In-Memory Statistics for Hadoop®, all of which are developed and provided by SAS Institute Inc. of Cary, N.C., USA.

Referring to FIG. 6, fewer, different, and additional components may be incorporated into worker device 600. Each worker device 600 of worker system 306 may include the same or different components or combination of components. Fourth input interface 602 provides the same or similar functionality as that described with reference to input interface 102 of classification model training device 100 though referring to worker device 600. Fourth output interface 604 provides the same or similar functionality as that described with reference to output interface 104 of classification model training device 100 though referring to worker device 600. Fourth communication interface 606 provides the same or similar functionality as that described with reference to communication interface 106 of classification model training device 100 though referring to worker device 600. Data and messages may be transferred between controller device 304 and worker device 600 using fourth communication interface 606. Fourth computer-readable medium 608 provides the same or similar functionality as that described with reference to computer-readable medium 108 of classification model training device 100 though referring to worker device 600. Fourth processor 610 provides the same or similar functionality as that described with reference to processor 110 of classification model training device 100 though referring to worker device 600.

Worker application 612 may be integrated with other analytic tools. As an example, worker application 612 may be part of an integrated data analytics software application and/or software architecture such as that offered by SAS Institute Inc. of Cary, N.C., USA. For example, worker application 612 may be part of SAS® Enterprise Miner™ developed and provided by SAS Institute Inc. of Cary, N.C., USA. Merely for further illustration, worker application 612 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS® Viya™, SAS In-Memory Statistics for Hadoop®, all of which are developed and provided by SAS Institute Inc. of Cary, N.C., USA.

Classification model training application 422, controller application 512, and worker application 612 may be the same or different applications that are integrated in various manners to train the classification model using input classified data 124 and input unclassified data 126. A copy of input classified data 124 may be stored on controller device 304 and/or each worker device 600 of worker system 306. Input unclassified data 126 may be distributed across controller device 304 and/or each worker device 600 of worker system 306 into input unclassified data subset 514 and/or input unclassified data subset 614, respectively.

Figure 7:
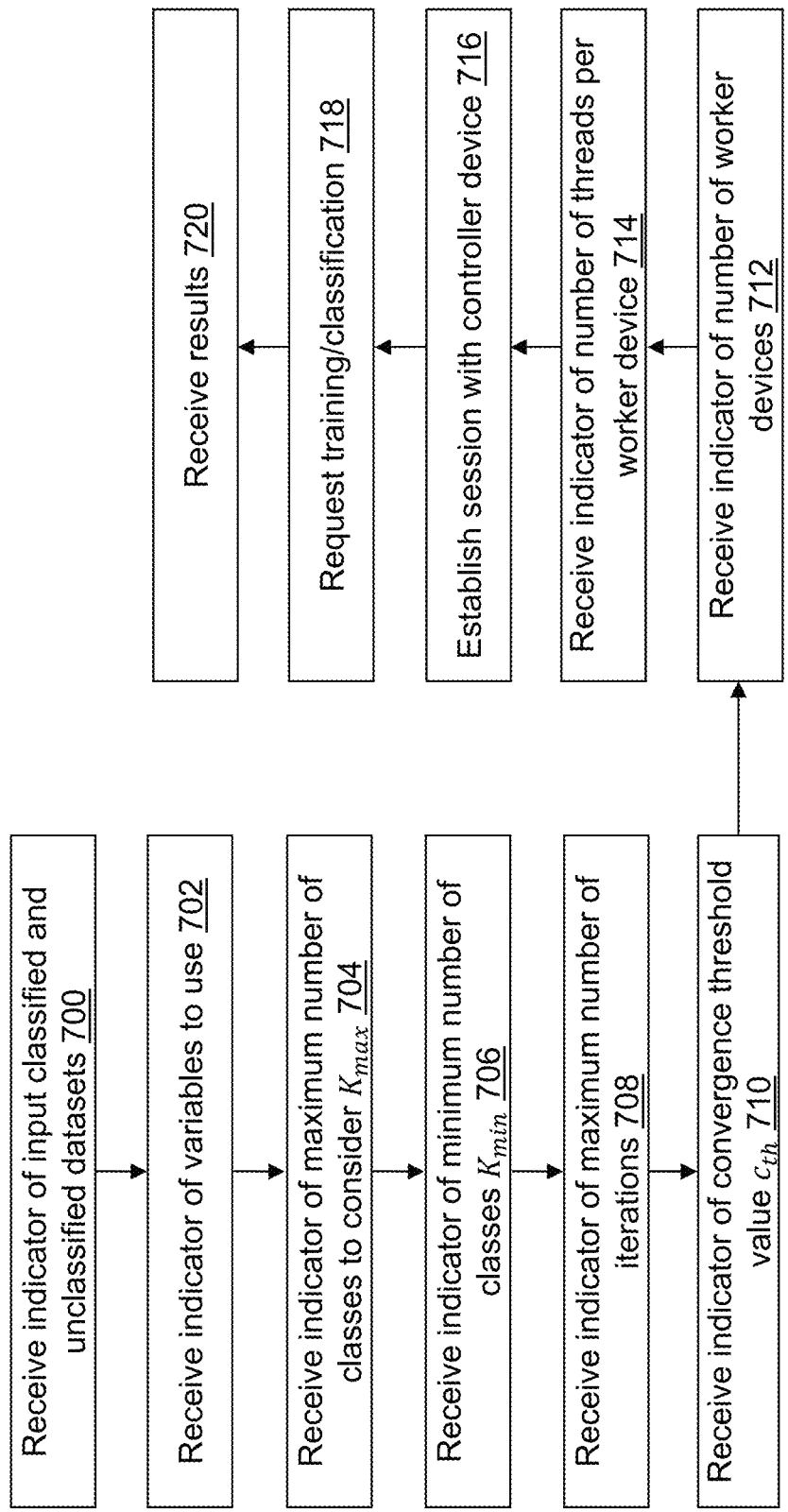
FIG. 7 depicts a flow diagram illustrating examples of operations performed by the user device of FIG. 4 in accordance with an illustrative embodiment.

Referring to FIG. 7, example operations associated with classification model training application 422 are described. Additional, fewer, or different operations may be performed depending on the embodiment. The order of presentation of the operations of FIG. 7 is not intended to be limiting. A user can interact with one or more user interface windows presented to the user in a display under control of classification model training application 422 independently or through a browser application in an order selectable by the user. Although some of the operational flows are presented in sequence, the various operations may be performed in various repetitions, concurrently, and/or in other orders than those that are illustrated. For example, a user may execute classification model training application 422, which causes presentation of a first user interface window, which may include a plurality of menus and selectors such as drop down menus, buttons, text boxes, hyperlinks, etc. associated with classification model training application 422 as understood by a person of skill in the art. As further understood by a person of skill in the art, various operations may be performed in parallel, for example, using a plurality of threads or a plurality of computing devices such as a grid or a cloud of computing devices.

Similar to classification model training application 122, classification model training application 422 may perform one or more of operations 200 to 210 to define parameters for execution of classification model training application 422.

Similar to operation 200, in an operation 700, the first indicator may be received that indicates input classified data 124 and input unclassified data 126. The first indicator further may indicate input unclassified data subset 514 and/or input unclassified data subset 614.

Similar to operation 202, in an operation 702, the second indicator may be received that indicates the plurality of variables to use in input classified data 124, input unclassified data subset 514, and/or input unclassified data subset 614).

Similar to operation 204, in an operation 704, the third indicator of the maximum number of classes to consider $K_{max}$ may be received.

Similar to operation 206, in an operation 706, the fourth indicator of the minimum number of classes to consider $K_{min}$ may be received. Again, as another option, the minimum number of classes to consider $K_{min}$ may be determined by computing a unique number of values for $y_i$ in input classified data 124. For example, a request may be sent to controller device 304 to determine $K_{min}$.

Similar to operation 208, in an operation 708, the fifth indicator of the maximum number of iterations $I_{max}$ may be received.

Similar to operation 210, in an operation 710, the sixth indicator of the convergence threshold value $c_{th}$ may be received.

In an operation 712, a seventh indicator may be received that indicates the number of computing devices W of worker system 306. In an alternative embodiment, the seventh indicator may not be received. For example, a default value may be stored, for example, in computer-readable medium 408 and used automatically. In another alternative embodiment, W may not be selectable. Instead, a fixed, predefined value may be used. The value further may be automatically determined based on a number of computing devices connected to controller device 304.

In an operation 714, an eighth indicator may be received that indicates a number of threads T of each computing device of worker system 306 and/or of controller device 304. In an alternative embodiment, the eighth indicator may not be received. For example, a default value may be stored, for example, in computer-readable medium 408 and used automatically. In another alternative embodiment, T may not be selectable. Instead, a fixed, predefined value may be used. The value further may be automatically determined based on a number of CPUs available in each computing device of worker system 306 and/or of controller device 304.

When W=0 and T=1, controller device 304 is performing the operations of FIGS. 2A and 2B. When W=0, controller device 304 may operate in single-machine mode meaning multithreaded operation using the number of threads T concurrently to take advantage of parallel execution on multiple processing units. When W=0, input classified data 124 and input unclassified data 126 is distributed into a plurality of input unclassified data subsets 514 with each thread of the plurality of threads allocated a single input unclassified data subset 514. When W>0, controller device 304 may be a grid host.

In an operation 716, a session is established with controller device 304 when user device 400 and controller device 304 are not integrated. The session may further be established with controller device 304 and each worker device 600 when W>0. User device 400 accepts commands from a user and relays instructions to controller device 304 when user device 400 and controller device 304 are not integrated. When W>0, controller device 304 establishes a communication network with the worker devices of worker system 306, sending instructions to the worker devices of worker system 306, collecting and aggregating the results of computations from the worker devices of worker system 306, and communicating final results to user device 400.

In an operation 718, training of the classification model is requested. The request further may indicate that the trained classification model be used to classify the observation vectors included in each input unclassified data subset 514. When controller device 304 and user device 400 are integrated in the same computing device, training is initiated as described further referring to FIGS. 8A, 8B, and 8C. The request may include zero or more of the values defined for the parameters indicated in operations 700 to 714 or zero or more of the values may be stored in a memory location known to controller device 304 when controller device 304 and user device 400 are not integrated in the same computing device.

In an operation 720, some or all of the selected information output in operation 260, when classification is requested, and in operation 262 may be received from controller device 304 when controller device 304 and user device 400 are not integrated in the same computing device. As another example, an indicator may be received that indicates that the training process is complete. For example, one or more output tables and/or one or more graphs may be presented on second display 416 when the training process is complete. As another option, second display 416 may present a statement indicating that the training process is complete. The user can access the output tables in a predefined location.

Figure 8A:
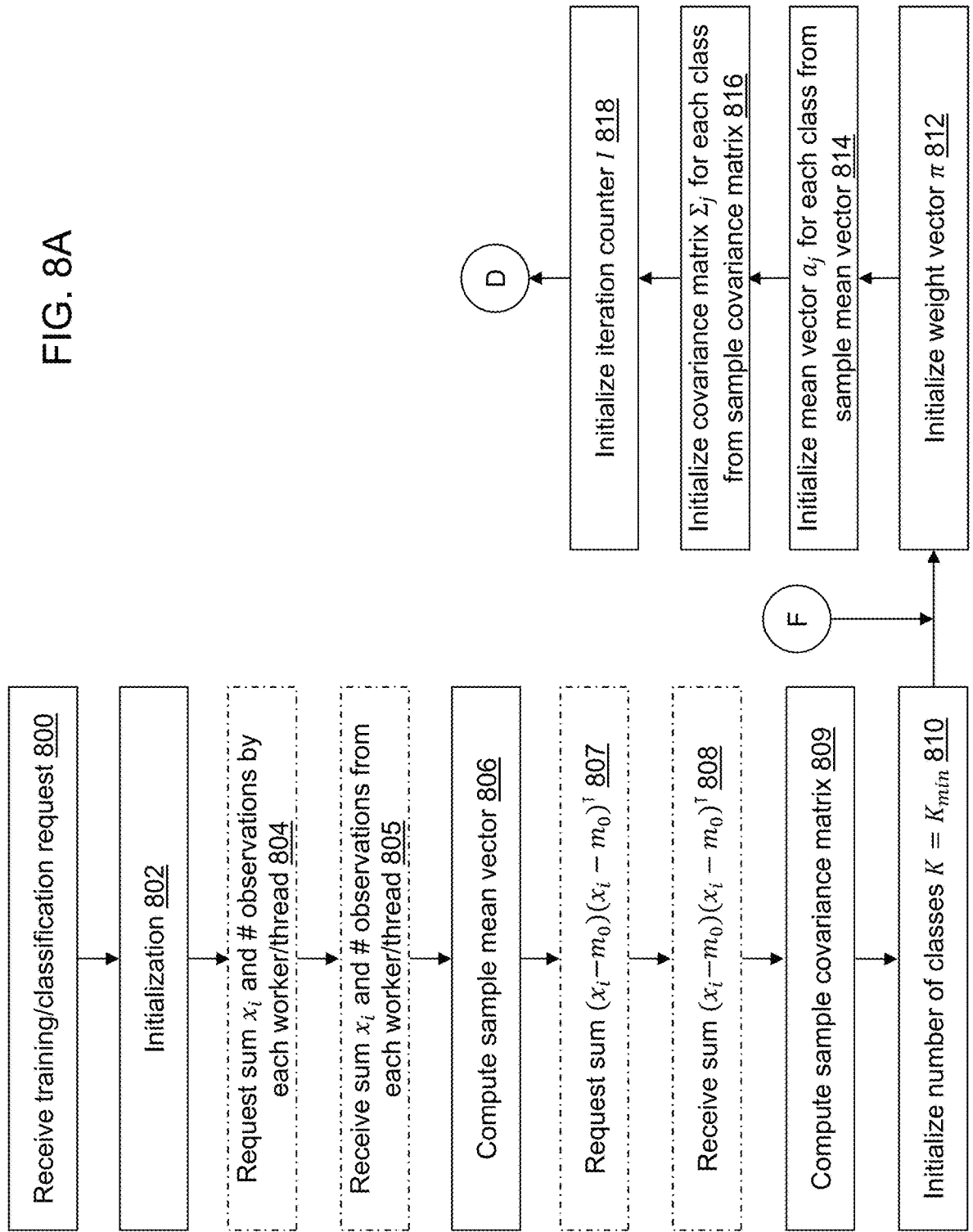
FIGS. 8A, 8B, and 8C depicts a flow diagram illustrating examples of operations performed by the controller device of FIG. 5 in accordance with an illustrative embodiment.
Figure 8B:
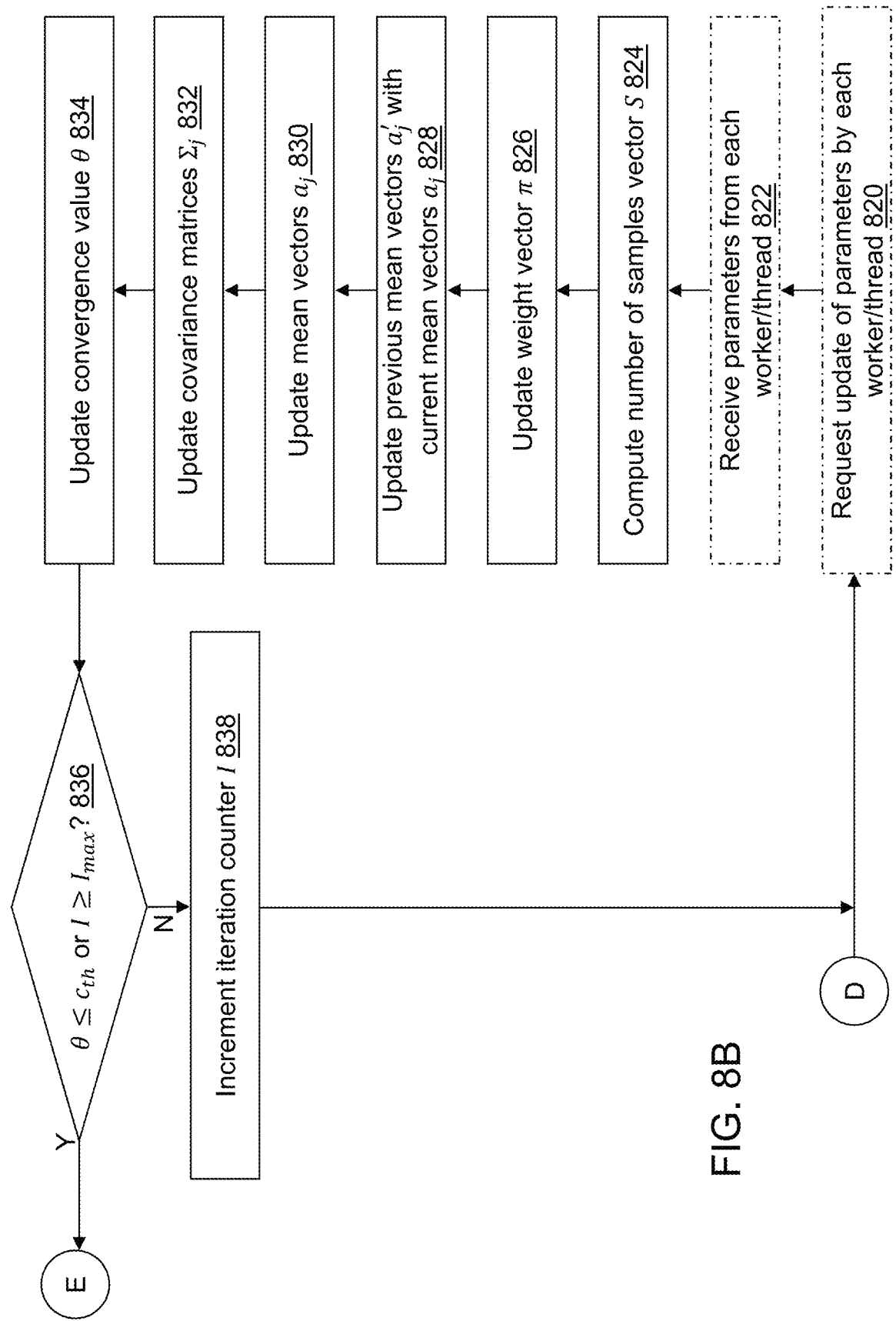
Figure 8C:
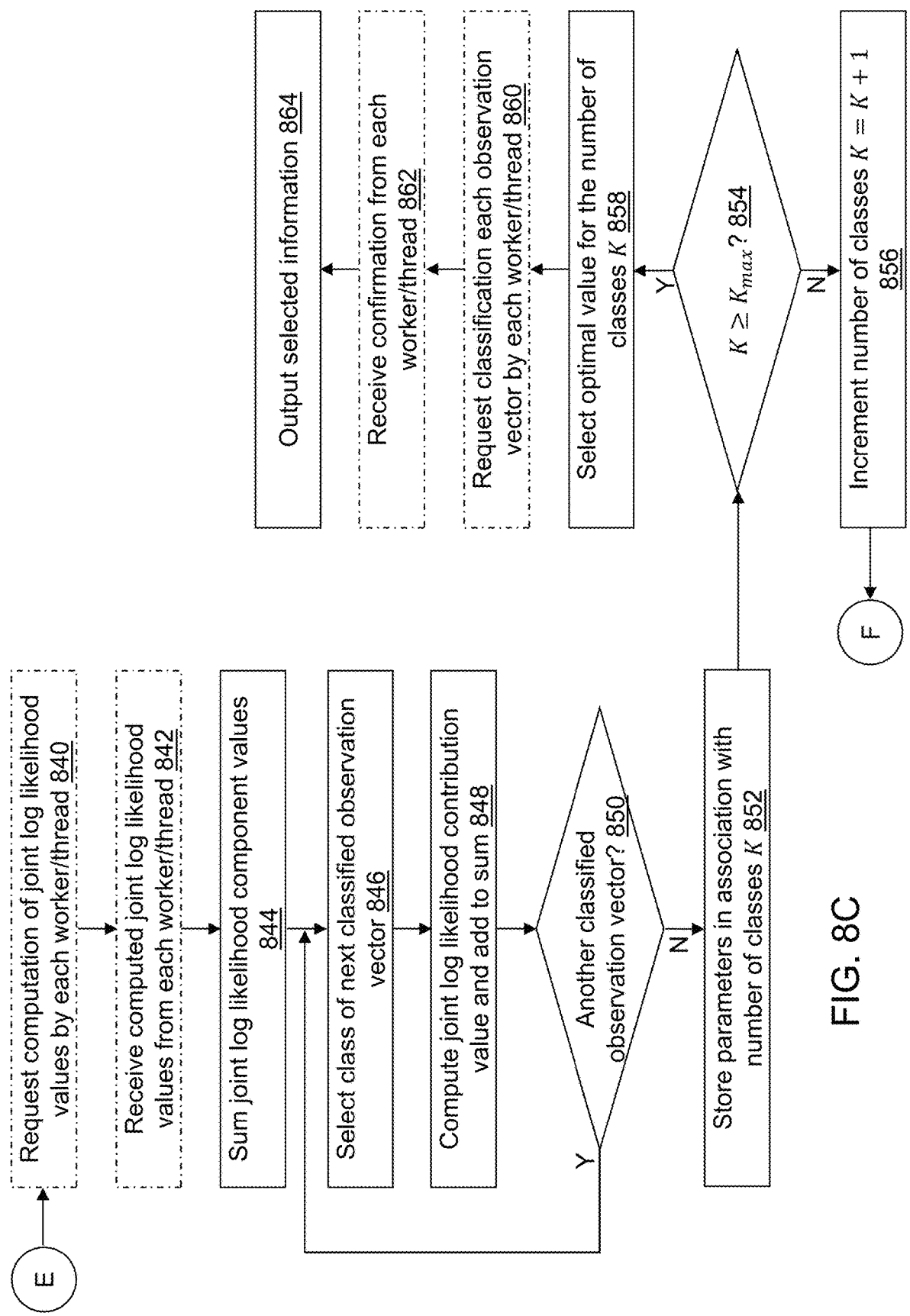

Referring to FIGS. 8A, 8B, and 8C, example operations associated with controller application 512 are described. Additional, fewer, or different operations may be performed depending on the embodiment. The order of presentation of the operations of FIGS. 8A, 8B, and 8C is not intended to be limiting. Again, controller application 512 and classification model training application 422 may be integrated or be the same applications so that the operations of FIG. 7 and FIGS. 8A, 8B, and 8C are merged.

In an operation 800, the training/classification request may be received from user device 400 or directly from the user of user device 400 when controller device 304 and user device 400 are integrated in the same computing device.

In an operation 802, values for the parameters indicated in operations 700 to 714 may be received from user device 400 or directly from the user of user device 400, when integrated, read from a known storage location to initialize the values locally, etc. Additionally, to the extent that input classified data 124 is not already stored on controller device 304 and/or on each worker device 600 of worker system 306, a copy is obtained. For example, controller device 304 may obtain a copy based on the first indicator and distribute a copy to each worker device 600 of worker system 306 when W>0. Similarly, to the extent that input unclassified data 126 is not already distributed across and/or each worker device 600 of worker system 306, input unclassified data 126 is distributed based on the values of W and T and whether controller device 304 is also performing operations as a worker.

In an operation 804, a request is sent to each thread of each worker device 600 of worker system 306 and/or to each thread of controller device 304. The request indicates that each worker/thread compute $\Sigma_{i=1}^{n_{w,t}} x_i$ and determine a number of observation vectors $n_{w,t}$ for input unclassified data subset 514 allocated to each thread of controller device 304 and/or input unclassified data subset 614 distributed to each worker device 600 and allocated to each thread of worker device 600 where the subscript w indicates an index to the respective worker device 600, and t indicates an index to the respective thread of the respective worker device 600. When controller device 304 is included as a worker device, W is incremented using W=W+1 to indicate that the values computed by each thread of controller device 304 on each input unclassified data subset 514 are included in the summations below. The request may be broadcast by a controller thread of controller device 304.

In an operation 805, the $\Sigma_{i=1}^{n_{w,t}} x_i$ and determined $n_{w,t}$ are received from each thread of each worker device 600 of worker system 306 and/or from each thread of controller device 304. The values may be received by the controller thread of controller device 304. The $\Sigma_{i=1}^{n_{w,t}} x_i$ received from each worker/thread may be denoted as $m_{w,t}$, where the subscript w indicates an index to the respective worker device 600 and/or controller device 304, t indicates an index to the respective thread of the respective worker device 600 and/or controller device 304, and $m_{w,t}$ is a vector with $N_i$ values.

Similar to operation 212, in an operation 806, the sample mean vector m may be computed using $$m = \frac{1}{N}\left(\left(\sum_{w=1}^{W}\sum_{t=1}^{T} m_{w,t}\right) + \sum_{i=1}^{n} x_i\right),$$

where $N=n+\Sigma_{w=1}^{W}\Sigma_{t=1}^{T} n_{w,t}$, and $x_i$ is the $i^{th}$ observation vector read from input classified data 124. When input classified data 124 is not stored on controller device 304, the computation of $\Sigma_{i=1}^{n} x_i$ and of n may be requested from any worker device 600 of worker system 306.

In an operation 807, a request is sent to each thread of each worker device 600 of worker system 306 and/or to each thread of controller device 304 that includes the sample mean vector m. The request indicates that each worker/thread compute $\Sigma_{i=1}^{n_{w,t}}(x_i-m)(x_i-m)^T$ for input unclassified data subset 514 allocated to each thread of controller device 304 and/or input unclassified data subset 614 distributed to each worker device 600 and allocated to each thread of worker device 600 where the subscript w indicates an index to the respective worker device 600, and t indicates an index to the respective thread of the respective worker device 600. In an illustrative embodiment, the request may be broadcast to each worker device 600 by the controller thread of controller device 304.

In an operation 808, $\Sigma_{i=1}^{n_{w,t}}(x_i-m)(x_i-m)^T$ is received from each thread of each worker device 600 of worker system 306 and/or from each thread of controller device 304. The values are received by the controller thread of controller device 304. The $\Sigma_{i=1}^{n_{w,t}}(x_i-m)(x_i-m)^T$ received from each worker/thread may be denoted as $p_{w,t}$, where the subscript w indicates an index to the respective worker device 600 and/or controller device 304, and t indicates an index to the respective thread of the respective worker device 600 and/or controller device 304.

Similar to operation 214, in an operation 809, sample covariance matrix C is computed using $$C = \frac{1}{N-1}\left(\left(\sum_{w=1}^{W}\sum_{t=1}^{T} p_{w,t}\right) + \sum_{i=1}^{n}(x_i - m)(x_i - m)^\top\right).$$

When input classified data 124 is not stored on controller device 304, the computation of $\Sigma_{i=1}^{n}(x_i-m)(x_i-m)^T$ may be requested from any worker device 600 of worker system 306.

Similar to operation 216, in an operation 810, the number of classes K is initialized, for example, as $K=K_{min}$.

Similar to operation 218, in an operation 812, the weight vector $\pi$ is initialized that includes a value for each class.

Similar to operation 220, in an operation 814, the mean vector $a_j$ is initialized for each class using the sample mean vector m such that $a_j=m$, $j=1, 2, \ldots, K$.

Similar to operation 222, in an operation 816, the covariance matrix $\Sigma_j$ is initialized for each class using the sample covariance matrix C such that $\Sigma_j=C$, $j=1, 2, \ldots, K$.

Similar to operation 224, in an operation 818, an iteration counter I is initialized, for example, as I=1, and processing continues in an operation 820 shown referring to FIG. 8B.

In operation 820, a request is sent to each thread of each worker device 600 of worker system 306 and/or to each thread of controller device 304. The request indicates that each worker/thread update values for the number of samples vector S, the mean vector $a_j$, and the covariance matrix $\Sigma_j$ for input unclassified data subset 514 allocated to each thread of controller device 304 and/or input unclassified data subset 614 distributed to each worker device 600 and allocated to each thread of worker device 600. In an illustrative embodiment, the request may be broadcast to each worker device 600 by the controller thread of controller device 304. The request may include the mean vector $a_j$ for each class and the number of classes K.

In an operation 822, the number of samples vector $S_{w,t,j}$, the mean vector $a_{w,t,j}$, and the covariance matrix $\Sigma_{w,t,j}$ are received from each thread of each worker device 600 of worker system 306 and/or from each thread of controller device 304. The values are received by the controller thread of controller device 304.

Similar to operation 228, in an operation 824, the number of samples vector S is computed, for example, using $S_j=\Sigma_{w=1}^{W}\Sigma_{t=1}^{T} S_{w,t,j}+n$, $j=1, 2, \ldots, K$.

Similar to operation 230, in an operation 826, the weight vector $\pi$ is updated, for example, using $$\pi_j = \frac{S_j}{N}, \quad j = 1, 2, \ldots, K.$$

Similar to operation 232, in an operation 828, the mean previous vectors $a_j'$ are updated with mean vector $a_j$, for example, using $a_j'=a_j$, $j=1, 2, \ldots, K$.

Similar to operation 240, in an operation 830, the mean vector $a_j$ for each class is updated, for example, using $$a_j = \frac{1}{S_j}\left(\sum_{t=1}^{W}\sum_{t=1}^{T} a_{w,t,j} + \sum_{i=1}^{n} z_{i,j} a_j'\right), \quad j = 1, 2, \ldots, K.$$

When input classified data 124 is not stored on controller device 304, the computation of $\Sigma_{i=1}^{n} z_{i,j} a_j'$ may be requested from any worker device 600 of worker system 306. $a_j'$ may be included in the request.

Similar to operation 242, in an operation 832, the covariance matrix $\Sigma_j$ for each class is updated, for example, using $$\sum_j = \frac{1}{S_j}\left(\sum_{w=1}^{W}\sum_{t=1}^{T}\sum_{w,t,j} + \sum_{i=1}^{n} z_{i,j}(a_j' - a_j)(a_j' - a_j)^\top\right),$$

$$j = 1, 2, \ldots, K.$$

When input classified data 124 is not stored on controller device 304, the computation of $\Sigma_{i=1}^{n} z_{i,j}(a_j'-a_j)(a_j'-a_j)^T$ may be requested from any worker device 600 of worker system 306. $a_j$ may be included in the request.

Similar to operation 244, in an operation 834, a convergence value $\theta$ is computed, for example, using $\theta=\Sigma_{j=1}^{K}\|a_j-a_j'\|$.

Similar to operation 246, in an operation 836, a determination is made concerning whether convergence has been achieved or the maximum number of iterations have been performed. If $\theta \leq c_{th}$ or $I \geq I_{max}$, processing continues in an operation 840 shown referring to FIG. 8C. If $\theta > c_{th}$ and $I<I_{max}$, processing continues in an operation 838.

Similar to operation 248, in operation 838, the iteration counter I is incremented, for example, as I=I+1, and processing continues in operation 820.

Referring to FIG. 8C, in an operation 840, a request is sent to each thread of each worker device 600 of worker system 306 and/or to each thread of controller device 304. The request indicates that each worker/thread compute values for $\Sigma_{i=1}^{n_{w,t}}\Sigma_{j=1}^{K} z_{i,j} \log \pi_j G(x_i|a_j, \Sigma_j)$ for input unclassified data subset 514 allocated to each thread of controller device 304 and/or input unclassified data subset 614 distributed to each worker device 600 and allocated to each thread of worker device 600. The request may include $\pi_j$, $a_j$, and $\Sigma_j$ for each class $j=1, 2, \ldots, K$. In an illustrative embodiment, the request may be broadcast to each worker device 600 by the controller thread of controller device 304.

In an operation 842, the $\Sigma_{i=1}^{n_{w,t}}\Sigma_{j=1}^{K} z_{i,j} \log \pi_j G(x_i|a_j, \Sigma_j)$ is received from each thread of each worker device 600 of worker system 306 and/or from each thread of controller device 304. The values are received by the controller thread of controller device 304. The $\Sigma_{i=1}^{n_{w,t}}\Sigma_{j=1}^{K} z_{i,j} \log \pi_j G(x_i|a_j, \Sigma_j)$ received from each worker/thread may be denoted as $w_{w,t}$.

Similar to operation 250, in an operation 844, $W_{ll}$ is computed, for example, using $W_{ll}=\Sigma_{w=1}^{W}\Sigma_{t=1}^{T} w_{w,t}$. The joint log likelihood value $W_{ll}$ does not include the contribution from input classified data 124, which may be added in operations 846 to 852 by controller device 304. When input classified data 124 is not stored on controller device 304, the computations of operations 846 to 852 may be may be requested from any worker device 600 of worker system 306. The request may include $\pi_j$, $a_j$, and $\Sigma_j$ for each class j=1, 2, . . . , K.

In an operation 846, a class index $l_i$ of a next classified observation vector $x_i$ indicates the class defined by the target variable value $y_i$ of the next classified observation vector $x_i$ included in input classified data 124.

In an operation 848, the joint log likelihood contribution value for the next classified observation vector is added to $W_{ll}=W_{ll}+\log \pi_{l_i}G(a_{l_i}, \Sigma_{l_i})$.

In an operation 850, a determination is made concerning whether each classified observation vector included in input classified data 124 has been processed. If each classified observation vector has been processed, processing continues in an operation 852. If each classified observation vector has not been processed, processing continues in operation 846.

Similar to operation 252, in an operation 852, $W_{ll}$, the mean vector $a_j$ for each class, and the covariance matrix $\Sigma_j$ for each class are stored in association with the number of classes K.

Similar to operation 254, in an operation 854, a determination is made concerning whether each number of classes has been evaluated. If $K \geq K_{max}$, processing continues in an operation 858. If $K<K_{max}$, processing continues in an operation 856.

Similar to operation 256, in operation 856, the number of classes K is incremented, for example, as K=K+1, and processing continues in operation 812.

Similar to operation 258, in operation 858, an optimal value for the number of classes $K_o$ is selected based on the joint log likelihood value $W_{ll}$ computed and stored in association with each number of classes from $K_{min}$ to $K_{max}$.

In operation 860, a request is sent to each thread of each worker device 600 of worker system 306 and/or to each thread of controller device 304 when classification was requested by user device 400. The request indicates that each worker/thread determine a classification for each observation vector included in input unclassified data subset 514 allocated to each thread of controller device 304 and/or input unclassified data subset 614 distributed to each worker device 600 and allocated to each thread of worker device 600. The request may indicate that each worker/thread output the classification, for example, to classification output data 128. In an illustrative embodiment, the request may be broadcast to each worker device 600 by the controller thread of controller device 304. The request may include the mean vector $a_j$ for each class j=1, 2, . . . , $K_o$.

In an operation 862, confirmation that the classification is complete is received from each thread of each worker device 600 of worker system 306 and/or from each thread of controller device 304.

Similar to operation 262, in an operation 864, the mean vector $a_1$ and the covariance matrix $\Sigma_j$ computed for each class j=1, 2, . . . , $K_o$ of the optimal number of classes $K_o$ are output to define a trained classification model.

Referring to FIGS. 9A, 9B, 9C, 9D, and 9E, example operations associated with worker application 612 are described. Each thread of the number of threads T of each worker device 600 of worker system 306 also execute the operations of FIGS. 9A, 9B, 9C, 9D, and 9E with the assigned input unclassified data subset 514. Additional, fewer, or different operations may be performed depending on the embodiment. The order of presentation of the operations of FIGS. 9A, 9B, 9C, 9D, and 9E is not intended to be limiting. When controller device 304 is acting as a worker device, each thread of the number of threads T of controller device 304 also executes the operations of FIGS. 9A, 9B, 9C, 9D, and 9E with the assigned input unclassified data subset 514.

Figure 9B:
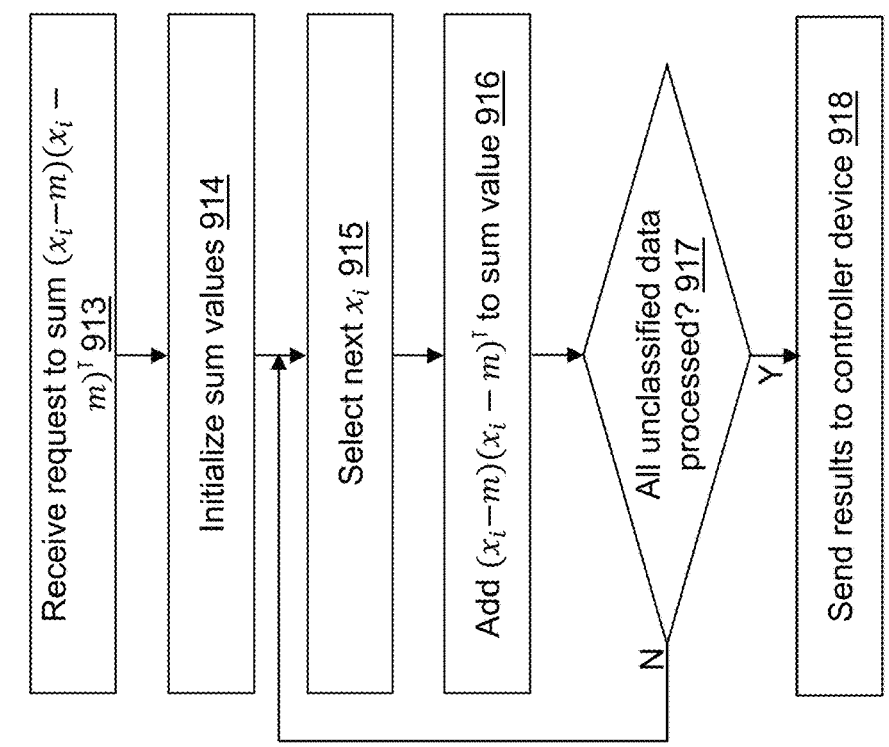
Figure 9A:
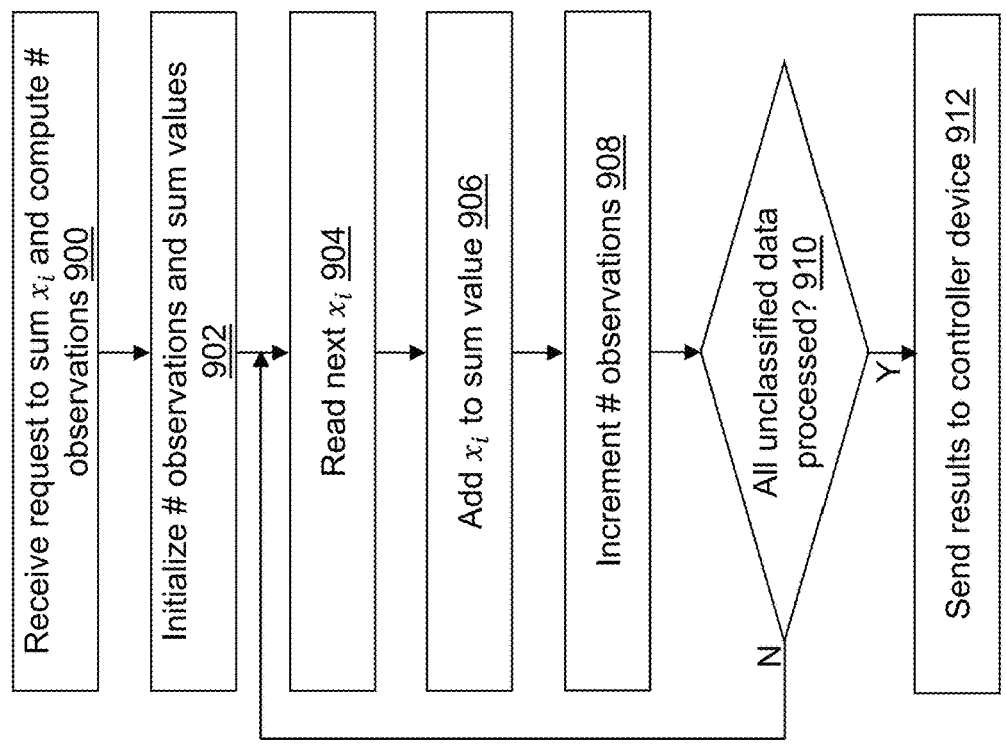

Referring to FIG. 9A, in an operation 900, the request to compute $\Sigma_{i=1}^{n} x_i$ and determine n for input unclassified data subset 614 or input unclassified data subset 514 is received from controller device 304 as a result of operation 804.

In an operation 902, the number of observations n is initialized, for example, as n=1, and the sum values m are initialized, for example, as m=0, where m is a vector with $N_v$ values.

In an operation 904, an observation vector $x_i$ is read from input unclassified data subset 614 allocated to the respective thread of worker device 600 or from input unclassified data subset 514 allocated to the respective thread of controller device 304. In an illustrative embodiment, the read data is stored in memory so that no further read of input unclassified data subset 614 allocated to the respective thread of worker device 600 or from input unclassified data subset 514 allocated to the respective thread of controller device 304 is performed.

In an operation 906, $m=m+x_i$.

In an operation 908, n=n+1.

In an operation 910, a determination is made concerning whether input unclassified data subset 614 allocated to the respective thread of worker device 600 or input unclassified data subset 514 allocated to the respective thread of controller device 304 has been read in operation 904. If all of input unclassified data subset 614 allocated to the respective thread or all of input unclassified data subset 514 allocated to the respective thread of controller device 304 has been processed, processing continues in an operation 912. Otherwise, processing continues in operation 904 to read a next observation vector.

In operation 912, m and n are sent from each thread of each worker device 600 of worker system 306 or from each thread of controller device 304 to controller device 304, and processing continues in operation 805 of FIG. 8A.

Referring to FIG. 9B, in an operation 913, the request to compute $\Sigma_{i=1}^{n_{w,t}}(x_i-m)(x_i-m)^T$ for input unclassified data subset 614 or input unclassified data subset 514 is received from controller device 304 as a result of operation 807. The request may include the mean vector m or the values may be otherwise provided to each worker/thread in a known memory location or based on a default value.

In an operation 914, the sum values p are initialized, for example, as p=0, where p is a matrix with Nock values.

In an operation 915, an observation vector $x_i$ is selected from input unclassified data subset 614 allocated to the respective thread of worker device 600 or from input unclassified data subset 514 allocated to the respective thread of controller device 304. When the data read in operation 904 is not stored in memory, the observation vector $x_i$ is read.

In an operation 916, $p=p+(x_i-m)(x_i-m)^T$.

In an operation 917, a determination is made concerning whether input unclassified data subset 614 allocated to the respective thread of worker device 600 or input unclassified data subset 514 allocated to the respective thread of controller device 304 has been read in operation 904. If all of input unclassified data subset 614 allocated to the respective thread or all of input unclassified data subset 514 allocated to the respective thread of controller device 304 has been processed, processing continues in an operation 918. Otherwise, processing continues in operation 915 to read a next observation vector.

In operation 918, p is sent from each thread of each worker device 600 of worker system 306 or from each thread of controller device 304 to controller device 304, and processing continues in operation 808 of FIG. 8A.

Figure 9C:
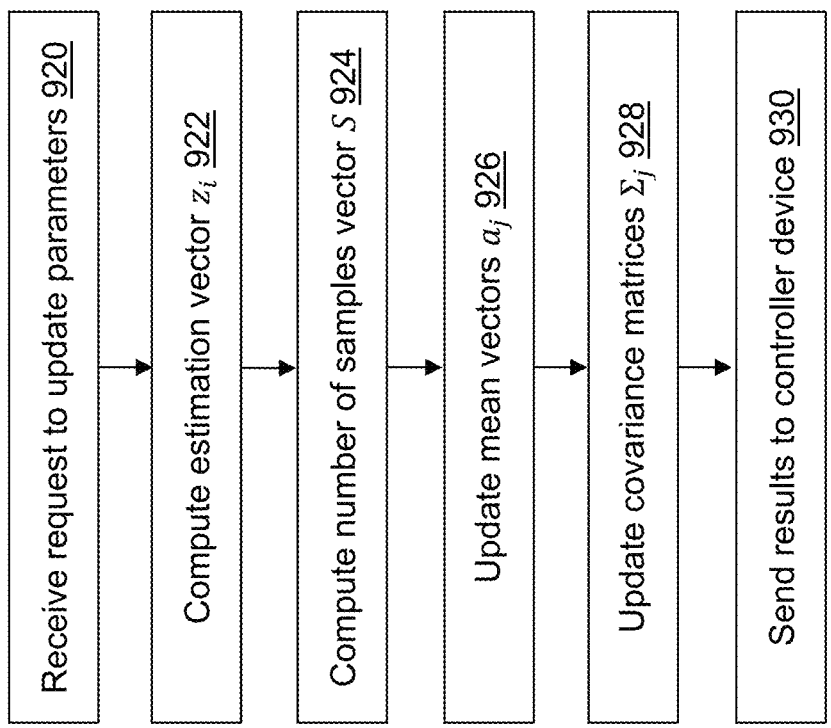

Referring to FIG. 9C, in an operation 920, the request to compute the number of samples vector S, the mean vector $a_j$, and the covariance matrix $\Sigma_j$ for input unclassified data subset 614 or input unclassified data subset 514 is received from controller device 304 as a result of operation 820. The request may include the mean vector $a_j$ for each class and the number of classes K.

Similar to operation 226, in an operation 922, an estimation matrix z is computed, for example, using $$W = \sum_{j=1}^{K} \frac{\pi_j e^{\left(-0.5\|x_i-a_j\|_{\Sigma_j}^2\right)}}{|\Sigma_j|^{0.5}},$$

$$z_{i,j} = \frac{\pi_j e^{\left(-0.5\|x_i-a_j\|_{\Sigma_j}^2\right)}}{W|\Sigma_j|^{0.5}}, \quad j=1,2,\ldots,K, \text{ and } i=1,2,\ldots,N$$

where N is a number of observation vectors input unclassified data subset 614 or input unclassified data subset 514 stored on controller device 304 or worker device 600, respectively.

Similar to operation 228, in an operation 924, a number of samples vector S is computed, for example, using $S_j=\Sigma_{i=1}^{N} z_{i,j}$, j=1, 2, . . . , K.

Similar to operation 240, in an operation 928, the mean vector $a_j$ for each class is updated, for example, using $$a_j = \frac{1}{S_j}\sum_{i=n+1}^{N} z_{i,j}x_i, \quad j=1,2,\ldots,K.$$

In an operation 242, the covariance matrix $\Sigma_j$ for each class is updated, for example, using $$\sum_{j} = \frac{1}{S_j}\left(\sum_{i=1}^{N} z_{i,j}(x_i-a_j)(x_i-a_j)^\top\right), \quad j=1,2,\ldots,K.$$

In operation 936, $S_j$, $a_j$, and $\Sigma_j$ are sent from each thread of each worker device 600 of worker system 306 or from each thread of controller device 304 to controller device 304, and processing continues in operation 822 of FIG. 8B.

Referring to FIG. 9D, in an operation 940, the request to compute the joint log likelihood value for each observation vector of input unclassified data subset 614 is received from controller device 304 as a result of operation 840. The request may include the updated $\pi_j$, $a_j$, and $\Sigma_j$ for each class j=1, 2, . . . , K.

In an operation 942, the joint log likelihood value $W_{ll}$ is initialized, for example, using $W_{ll}=0$.

In an operation 943, an observation vector $x_i$ is selected that was read previously from input unclassified data subset 614 allocated to the respective thread of worker device 600 or from input unclassified data subset 514 allocated to the respective thread of controller device 304.

Similar to operation 248, in an operation 944, the joint log likelihood value $W_{ll}$ is computed, for example, using $W_{ll}=W_{ll}+\Sigma_{j=1}^{K} z_{i,j} \log \pi_j G(x_i, \Sigma_j)$.

In an operation 946, a determination is made concerning whether input unclassified data subset 614 allocated to the respective thread of worker device 600 or input unclassified data subset 514 allocated to the respective thread of controller device 304 has been read in operation 944. If all of input unclassified data subset 614 allocated to the respective thread or all of input unclassified data subset 514 allocated to the respective thread of controller device 304 has been processed, processing continues in an operation 948. Otherwise, processing continues in operation 943 to process a next observation vector.

In operation 948, $W_{ll}$ is sent from each thread of each worker device 600 of worker system 306 or from each thread of controller device 304 to controller device 304, and processing continues in operation 842 of FIG. 8C.

Referring to FIG. 9E, in an operation 950, the request to determine a classification for each observation vector is received from controller device 304 as a result of operation 860. The request may include the mean vector $a_j$ for each class j=1, 2, . . . , $K_o$.

In an operation 952, an observation vector $x_i$ is selected that was read previously from input unclassified data subset 614 allocated to the respective thread of worker device 600 or from input unclassified data subset 514 allocated to the respective thread of controller device 304.

Similar to operation 260, in an operation 954, a distance value $D_j=D(x_i, a_j)$, j=1, 2, . . . , $K_o$ is computed between the observation vector $x_i$ and the mean vector $a_j$ of each class.

Similar to operation 260, in an operation 956, the class is identified for each observation vector $x_i$ included in input unclassified data 126 based on the computed distance value for each class. For illustration, $k_i=j$ having min $D_j$, j=1, 2, . . . , $K_o$.

In an operation 958, a determination is made concerning whether input unclassified data subset 614 allocated to the respective thread of worker device 600 or input unclassified data subset 514 allocated to the respective thread of controller device 304 has been read in operation 924. If all of input unclassified data subset 614 allocated to the respective thread or all of input unclassified data subset 514 allocated to the respective thread of controller device 304 has been processed, processing continues in an operation 960. Otherwise, processing continues in operation 952 to read a next observation vector.

In operation 960, classifications may be sent from each thread of each worker device 600 of worker system 306 to controller device 304, and processing continues in operation 862 of FIG. 8C. Alternatively, a confirmation of completion of the classification process may be sent and the identified class for each observation vector $x_i$ may be stored in classification output data 128 possibly with the respective observation vector $x_i$.

Figure 10A:
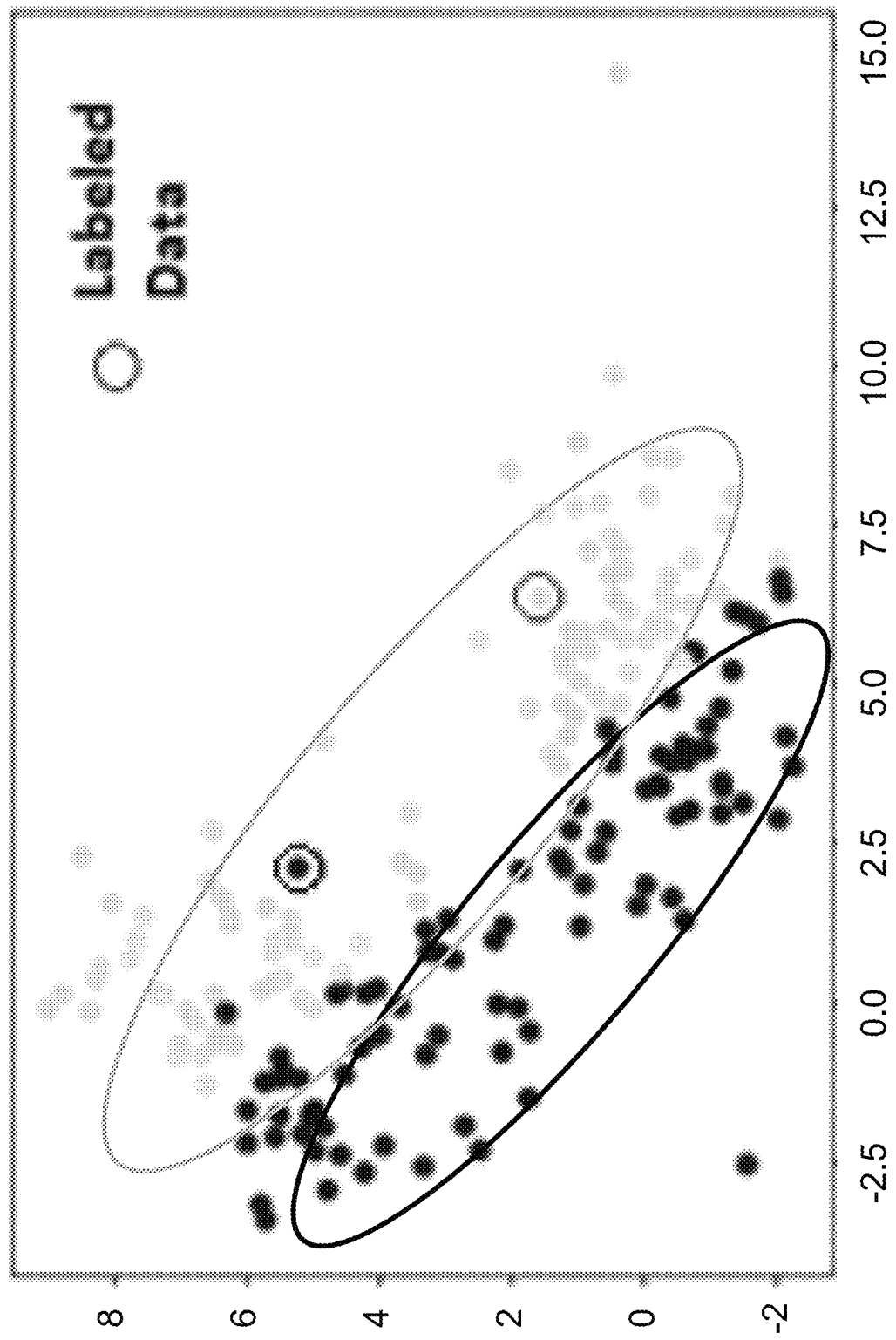
FIG. 10A shows a classification computed after a first iteration of operation 246 of FIG. 2B in accordance with an illustrative embodiment.
Figure 10B:
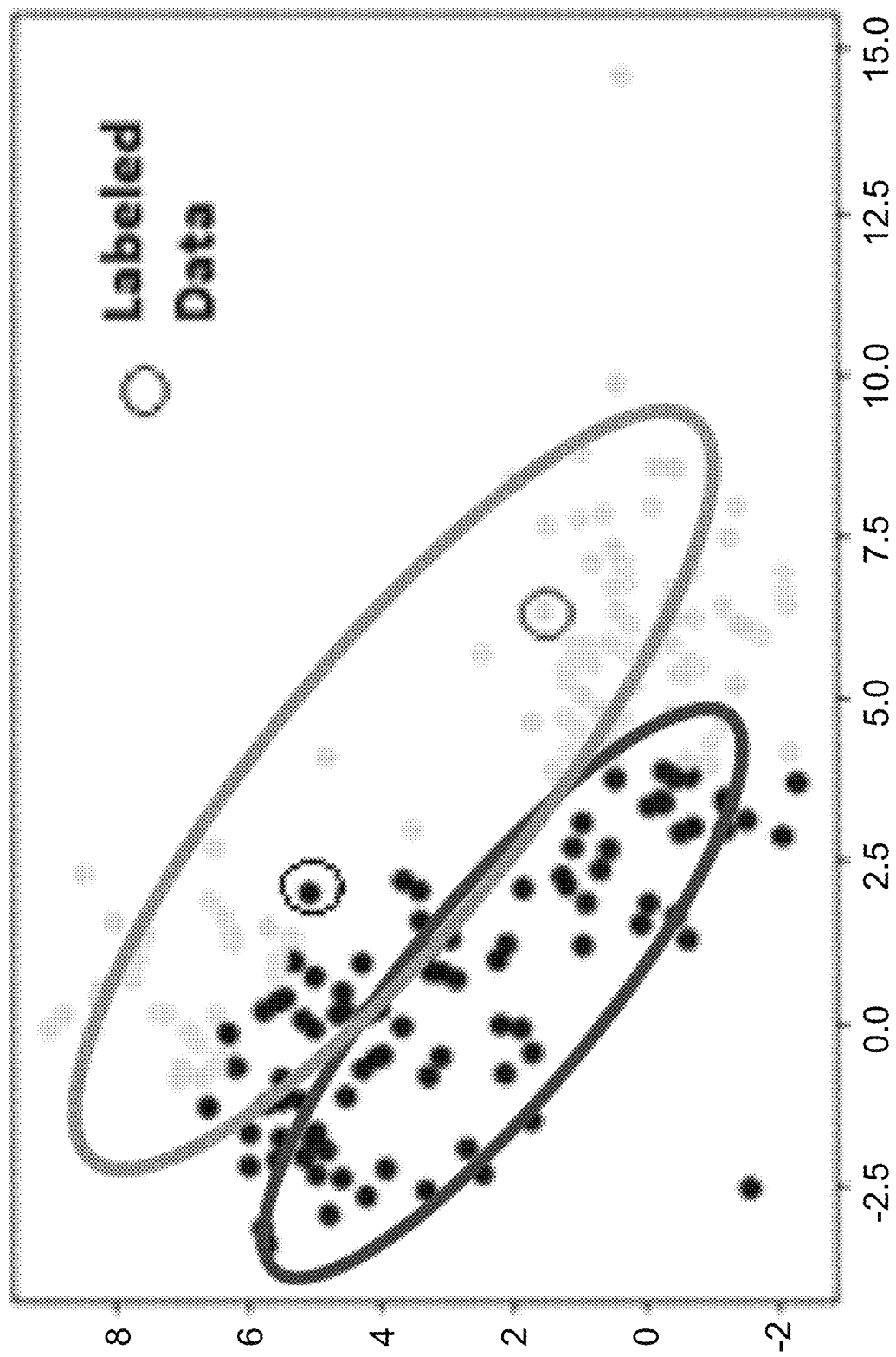
FIG. 10B shows a classification computed after a second iteration of operation 246 of FIG. 2B in accordance with an illustrative embodiment.
Figure 10C:
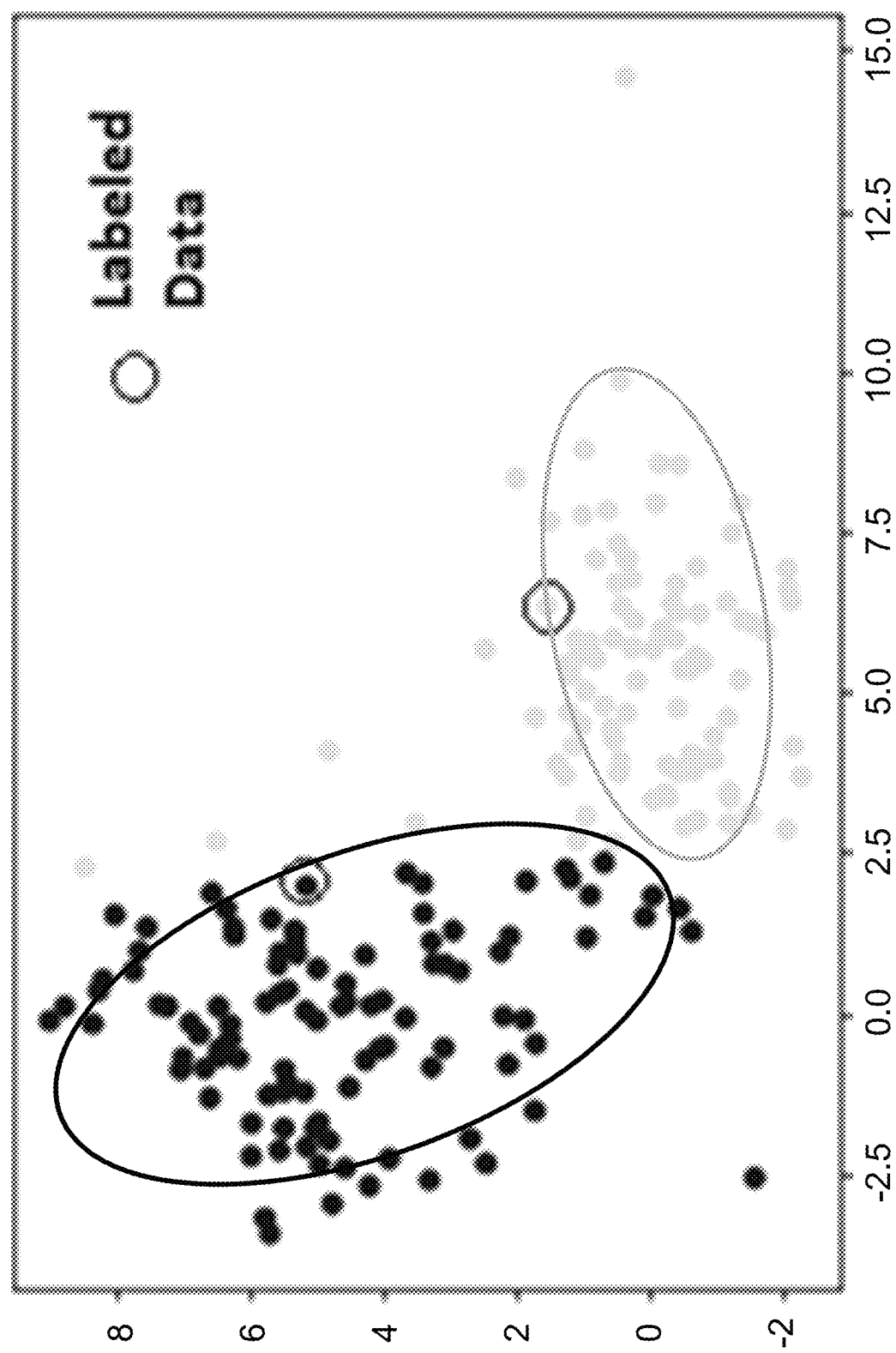
FIG. 10C shows a classification computed after a third iteration of operation 246 of FIG. 2B in accordance with an illustrative embodiment.
Figure 10D:
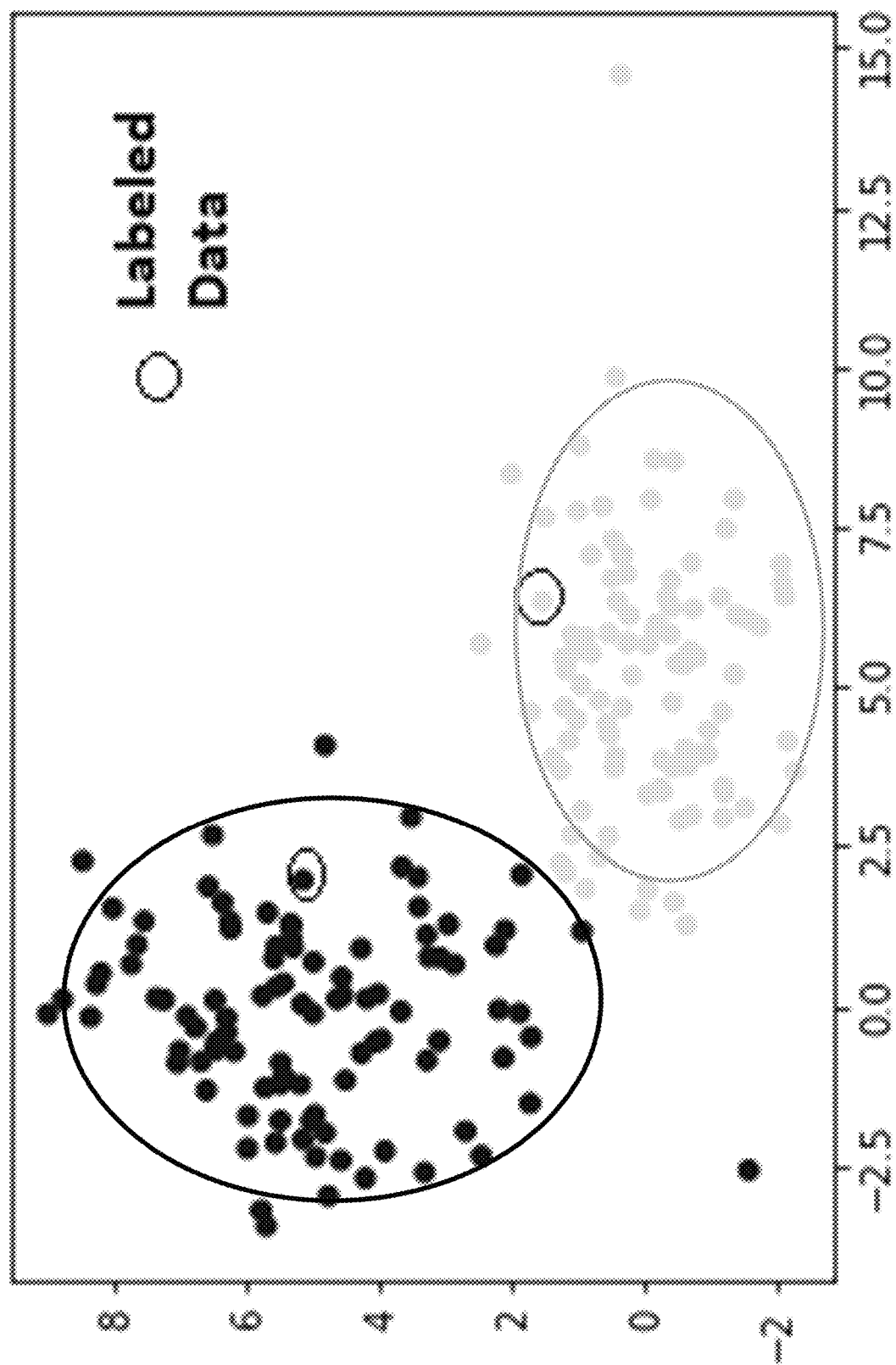
FIG. 10D shows a classification computed after a fourth iteration of operation 246 of FIG. 2B in accordance with an illustrative embodiment.
Figure 10E:
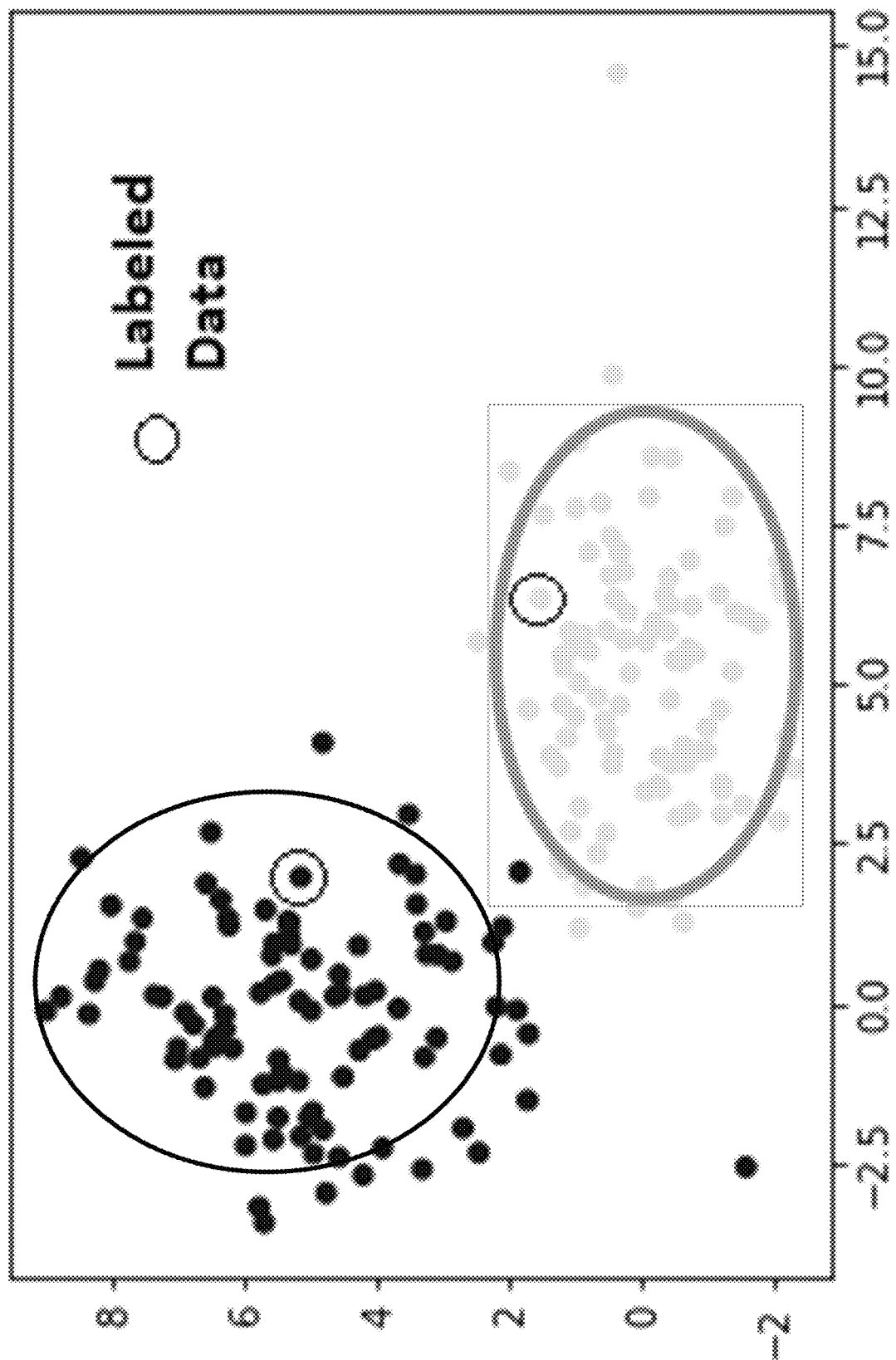
FIG. 10E shows a classification computed after a fifth iteration of operation 246 of FIG. 2B in accordance with an illustrative embodiment.
Figure 10F:
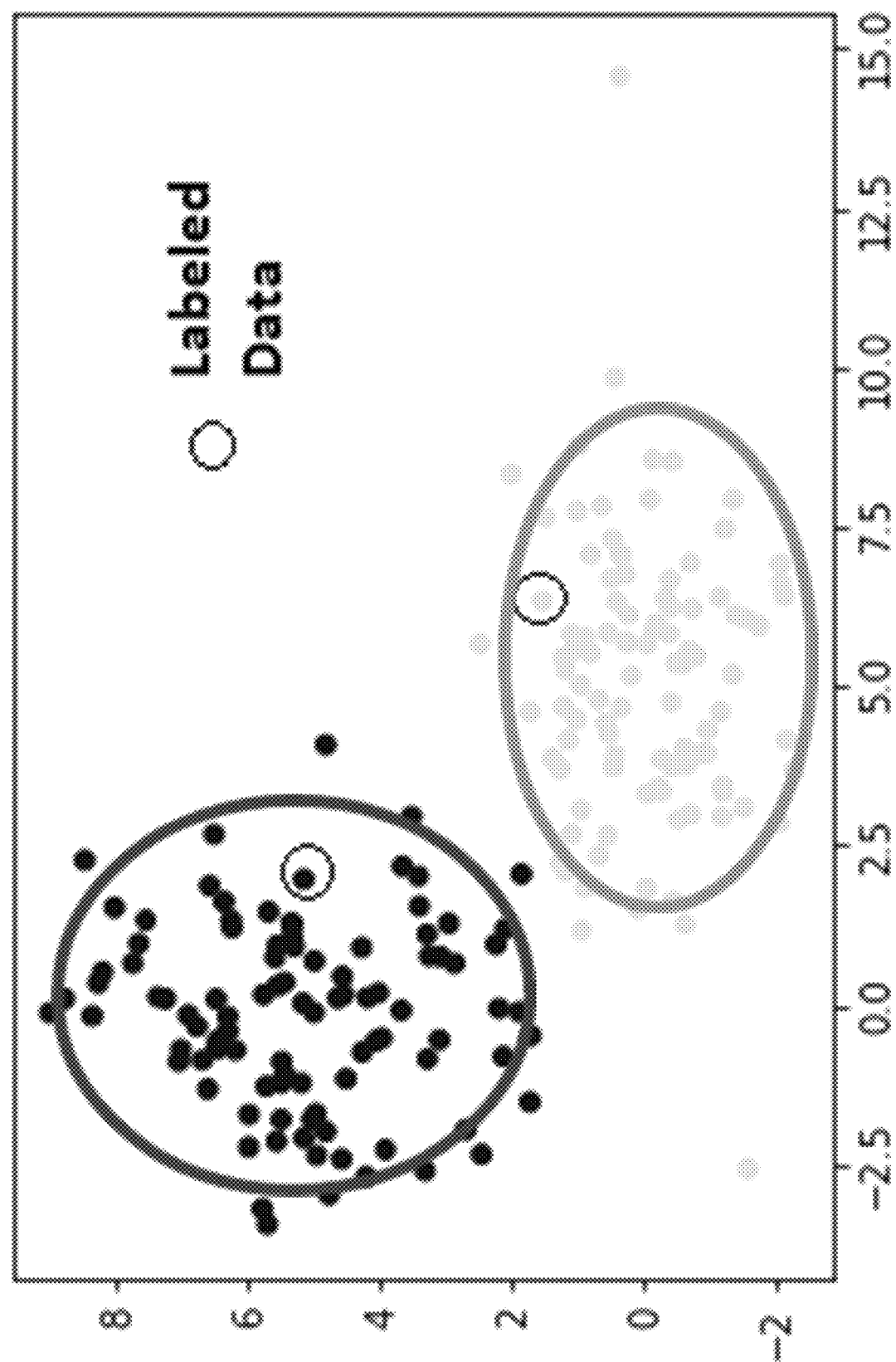
FIG. 10F shows a classification computed after a sixth iteration of operation 246 of FIG. 2B in accordance with an illustrative embodiment.

Experimental results were generated using the operations of classification model training application 122 with a 2-dimensional (2-D) synthetic dataset with 100 observations included in each class. A first class was Gaussian distributed with a mean value [0, 5] and a covariance matrix [2, 0; 0, 3]. A second class was Gaussian distributed with the mean value [5, 0] and the covariance matrix [4, 0; 0 1]. There was one classified data sample for each class and $c_{th}=0.01$. Referring to FIG. 10A, results after a first iteration through operation 246 are shown. Referring to FIG. 10B, results after a second iteration through operation 246 are shown. Referring to FIG. 10C, results after a third iteration through operation 246 are shown. Referring to FIG. 10D, results after a fourth iteration through operation 246 are shown. Referring to FIG. 10E, results after a fifth iteration through operation 246 are shown. Referring to FIG. 10F, results after a sixth iteration through operation 246 are shown. Convergence was achieved on the sixth iteration. The predicted first class is shown in gray and the predicted second class is shown in black. Ellipses are shown for the estimated covariance matrix for each class. Classification model training application 122 gracefully converges through the 6 iterations. With just one classified sample for each class, clustering using classification model training application 122 converged much faster compared to unsupervised methods.

Classification model training application 122 was implemented using the same 2-D synthetic dataset with 2 machines and compared to the performance with the single machine. The timing and accuracy results are shown in Table 1 below. As expected, the CPU time is much less. The accuracy is further improved in distributed mode due to the use of input classified data 124 at each machine.

TABLE 1

|  | Single Machine | Two Machines |
|---|---|---|
| CPU time | 6.5 s | 3.9 s |
| Accuracy | 95.5% | 98.9% |

Classification model training application 122 was compared to a k-means clustering process and to a Gaussian mixture model (GMM) process as shown in Table 2 below. The accuracy values were averaged over 5 executions. The classification accuracy has been significantly improved compared to the unsupervised learning methods of the k-means clustering and GMM.

TABLE 2

|  | K-means clustering | GMM clustering | Classification model training application 122 |
|---|---|---|---|
| Accuracy | 89.5% | 93.7% | 95.5% |

Table 3 below shows a probability P for each class from 2 to 5 for the 2-D synthetic dataset. For each observation, the estimated probability is a value between 0 and 1. So a total likelihood is a multiplication over n observations because they are independent, which is going to be a very small positive number. So the log likelihood value $W_{ll}$ of that value is going to be negative. Instead, a negative log likelihood value is used to make the probability P a positive number. So the smaller the probability P, the better the classification model is fit. Since the log-likelihood value $W_{ll}$ is the product of the probability for each sample, the smallest value for the negative likelihood indicates the largest probability for the trained classification model. As expected, K=2 results in the probability P that had the smallest value meaning the highest probability and defining the best fit for the trained classification model.

TABLE 3

| K | P |
|---|---|
| 2 | 94.37 |
| 3 | 102.5 |

TABLE 3-continued

| K | P |
|---|---|
| 4 | 117.3 |
| 5 | 135.6 |

Experimental results were also generated using the operations of classification model training application 122 with the IRIS dataset that includes three classes of Iris flowers: setosa, virginica, and versicolor. Two classified observations were defined for two of the three classes: setosa and versicolor. The accuracy performance that resulted using classification model training application 122 was compared with the classification performance using GMM clustering and using the process described in U.S. Pat. No. 10,354,204 assigned to the assignee of the present application.

TABLE 4

| GMM clustering | U.S. Pat. No. 10,354,204 | Classification model training application 122 |
|---|---|---|
| 95.3% | 72% | 98.7% |

As expected, since the process described in U.S. Pat. No. 10,354,204 cannot identify the third class, it classified all of the observations in the class of virginica as one of the other two classes. Even as compared to the GMM clustering process, classification model training application 122 identified the new classes and achieved a 3% better performance.

Figure 11:
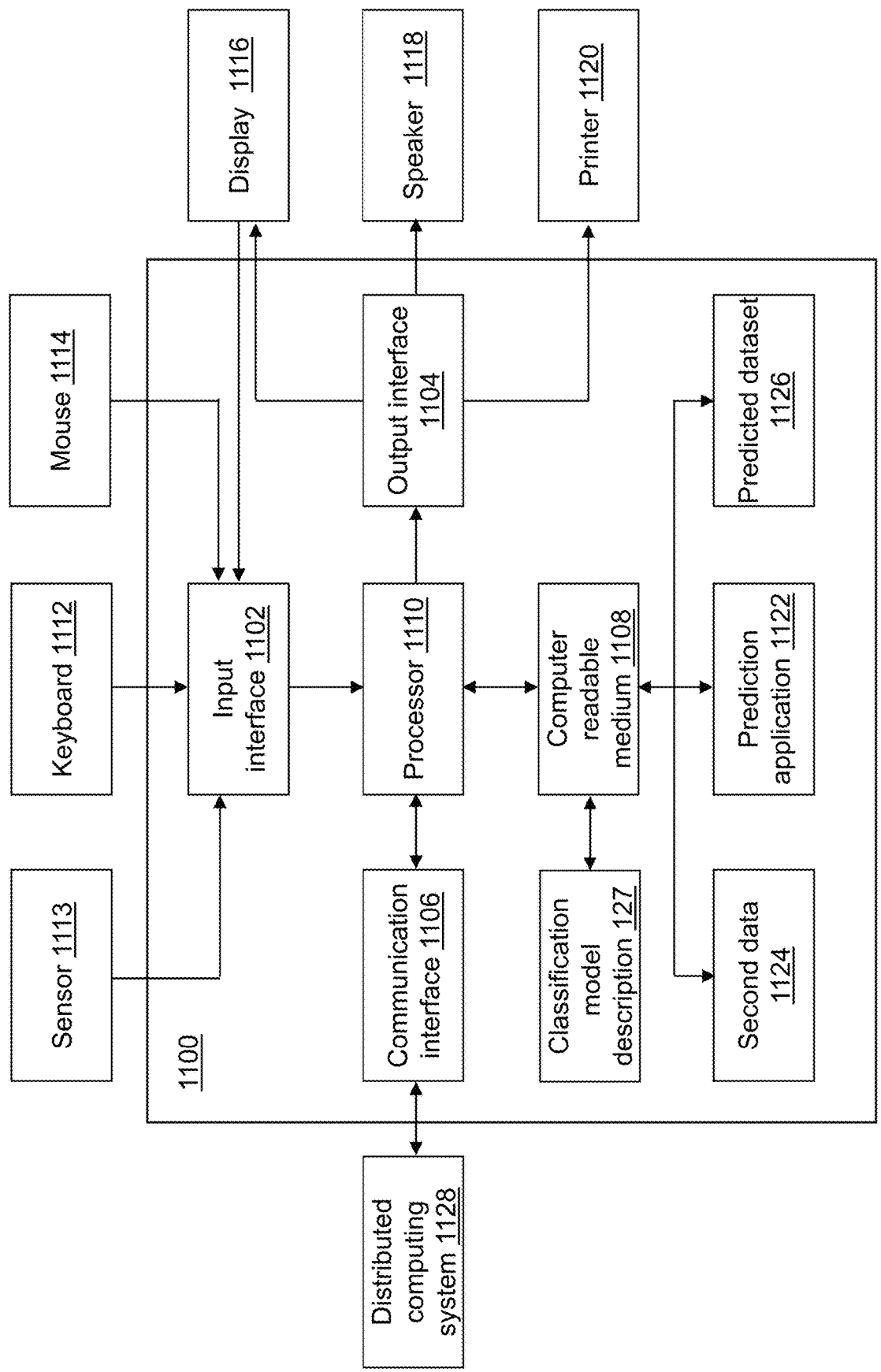
FIG. 11 depicts a block diagram of a prediction device in accordance with an illustrative embodiment.

Referring to FIG. 11, a block diagram of a prediction device 1100 is shown in accordance with an illustrative embodiment. Prediction device 1100 may include a fifth input interface 1102, a fifth output interface 1104, a fifth communication interface 1106, a fifth non-transitory computer-readable medium 1108, a fifth processor 1110, a prediction application 1122, classification model description 127, second data 1124, and predicted dataset 1126. Fewer, different, and/or additional components may be incorporated into prediction device 1100. Prediction device 1100 and user device 400 and/or controller device 304 and/or classification model training device 100 may be the same or different devices.

Fifth input interface 1102 provides the same or similar functionality as that described with reference to input interface 102 of classification model training device 100 though referring to prediction device 1100. Fifth output interface 1104 provides the same or similar functionality as that described with reference to output interface 104 of classification model training device 100 though referring to prediction device 1100. Fifth communication interface 1106 provides the same or similar functionality as that described with reference to communication interface 106 of classification model training device 100 though referring to prediction device 1100. Data and messages may be transferred between prediction device 1100 and a distributed computing system 1128 using fifth communication interface 1106. Fifth computer-readable medium 1108 provides the same or similar functionality as that described with reference to computer-readable medium 108 of classification model training device 100 though referring to prediction device 1100. Fifth processor 1110 provides the same or similar functionality as that described with reference to processor 110 of classification model training device 100 though referring to prediction device 1100.

Prediction application 1122 performs operations associated with classifying or predicting a classification of each observation vector included in second data 1124. The classification may be stored in predicted dataset 1126 to support various data analysis functions as well as provide alert/messaging related to the classified/predicted data. Dependent on the type of data stored in input classified data 124 and input unclassified data 126 (input unclassified data subset 514 and/or input unclassified data subset 614) and second data 1124, prediction application 1122 may identify anomalies as part of process control, for example, of a manufacturing process, for machine condition monitoring, for image classification, for intrusion detection, for fraud detection, etc. Some or all of the operations described herein may be embodied in prediction application 1122. The operations may be implemented using hardware, firmware, software, or any combination of these methods.

Referring to the example embodiment of FIG. 11, prediction application 1122 is implemented in software (comprised of computer-readable and/or computer-executable instructions) stored in fifth computer-readable medium 1108 and accessible by fifth processor 1110 for execution of the instructions that embody the operations of prediction application 1122. Prediction application 1122 may be written using one or more programming languages, assembly languages, scripting languages, etc. Prediction application 1122 may be integrated with other analytic tools. As an example, prediction application 1122 may be part of an integrated data analytics software application and/or software architecture such as that offered by SAS Institute Inc. of Cary, N.C., USA. For example, prediction application 1122 may be part of SAS® Enterprise Miner™ developed and provided by SAS Institute Inc. of Cary, N.C., USA. Merely for further illustration, prediction application 1122 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Analytics, SAS® Viya™, SAS In-Memory Statistics for Hadoop®, all of which are developed and provided by SAS Institute Inc. of Cary, N.C., USA. One or more operations of prediction application 1122 further may be performed by an ESPE. Prediction application 1122, classification model training application 122, classification model training application 422, controller application 512, and/or worker application 612 may be the same or different applications that are integrated in various manners to execute a classification model using input classified data 124 and input unclassified data 126 that may be distributed (input unclassified data subset 514 and/or input unclassified data subset 614) and/or second data 1124.

Prediction application 1122 may be implemented as a Web application. Prediction application 1122 may be integrated with other system processing tools to automatically process data generated as part of operation of an enterprise, to classify data in the processed data, and/or to provide a warning or alert associated with the data classification using fifth input interface 1102, fifth output interface 1104, and/or fifth communication interface 1106 so that appropriate action can be initiated in response. For example, a warning or an alert may be presented using a third display 1116, a third speaker 1118, a third printer 1120, etc. or sent to one or more computer-readable media, display, speaker, printer, etc. of distributed computing system 1128.

Input classified data 124 and input unclassified data 126 and second data 1124 may be generated, stored, and accessed using the same or different mechanisms. Similar to input classified data 124 and input unclassified data 126, second data 1124 may include a plurality of rows and a plurality of columns with the plurality of rows referred to as observations or records, and the columns referred to as variables that are associated with an observation. Second data 1124 may be transposed.

Similar to input classified data 124 and input unclassified data 126, second data 1124 may be stored on fifth computer-readable medium 1108 or on one or more computer-readable media of distributed computing system 1128 and accessed by prediction device 1100 using fifth communication interface 1106. Data stored in second data 1124 may be a sensor measurement or a data communication value, for example, from a sensor 1113, may be generated or captured in response to occurrence of an event or a transaction, generated by a device such as in response to an interaction by a user with the device, for example, from a third keyboard 1112 or a third mouse 1114, etc. The data stored in second data 1124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second data 1124 may be captured at different time points periodically, intermittently, when an event occurs, etc. One or more columns may include a time value. Similar to input classified data 124 and input unclassified data 126, data stored in second data 1124 may be generated as part of the IoT, and some or all data may be pre- or post-processed by an ESPE.

Similar to input classified data 124 and input unclassified data 126, second data 1124 may be stored in various compressed formats such as a coordinate format, a compressed sparse column format, a compressed sparse row format, etc. Second data 1124 further may be stored using various structures as known to those skilled in the art including a file system, a relational database, a system of tables, a structured query language database, etc. on prediction device 1100 and/or on distributed computing system 1128. Prediction device 1100 and/or distributed computing system 1128 may coordinate access to second data 1124 that is distributed across a plurality of computing devices that make up distributed computing system 1128. For example, second data 1124 may be stored in a cube distributed across a grid of computers as understood by a person of skill in the art. As another example, second data 1124 may be stored in a multi-node Hadoop® class. As another example, second data 1124 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in second data 1124.

Figure 12:
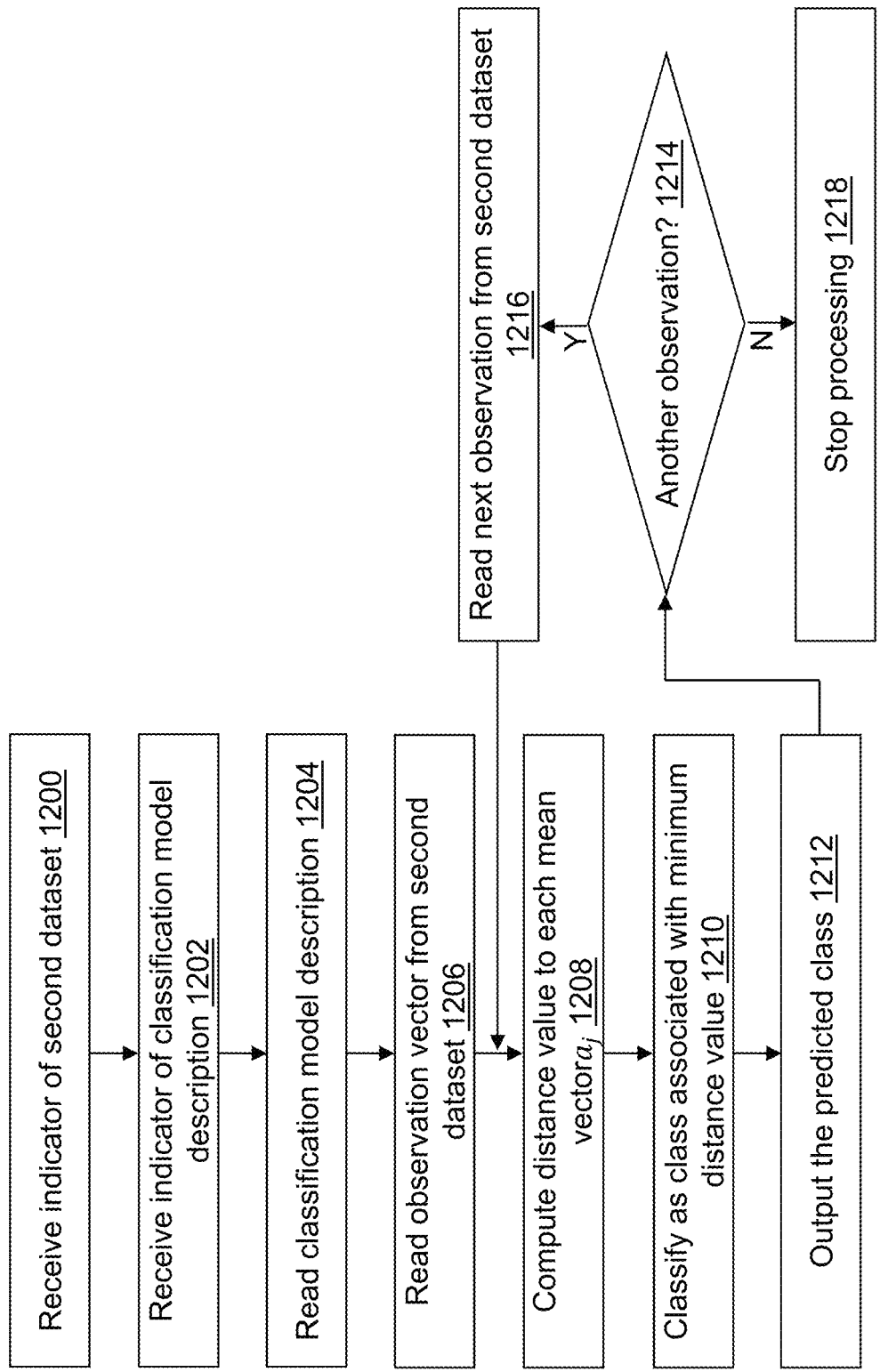
FIG. 12 depicts a flow diagram illustrating examples of operations performed by the prediction device of FIG. 11 in accordance with an illustrative embodiment.

Referring to FIG. 12, example operations of prediction application 1122 are described. Additional, fewer, or different operations may be performed depending on the embodiment of prediction application 1122. The order of presentation of the operations of FIG. 12 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 1200, a ninth indicator may be received that indicates second data 1124. For example, the ninth indicator indicates a location and a name of second data 1124. As an example, the ninth indicator may be received by prediction application 1122 after selection from a user interface window or after entry by a user into a user interface window. In an alternative embodiment, second data 1124 may not be selectable. For example, a most recently created dataset may be used automatically.

In an operation 1202, a tenth indicator may be received that indicates classification model description 127. For example, the tenth indicator indicates a location and a name of classification model description 127. As an example, the tenth indicator may be received by prediction application 1122 after selection from a user interface window or after entry by a user into a user interface window. In an alternative embodiment, classification model description 127 may not be selectable. For example, a most recently created model configuration data may be used automatically. As another example, classification model description 127 may be provided automatically as part of integration with classification model training application 122, classification model training application 422, controller application 512, and/or worker application 612.

In an operation 1204, a classification model description is read from classification model description 127.

In an operation 1206, an observation vector $x_i$ is read from second data 1124.

Similar to operation 260, in an operation 1208, a distance value $D_j=D(x_i, a_i)$, $j=1, 2, \ldots, K_o$ is computed between the observation vector $x_i$ and the mean vector $a_j$ of each class read from the classification model description.

Similar to operation 260, in an operation 1210, the class is identified for observation vector $x_i$ based on the computed distance value for each class. For illustration, $k_i=j$ having min $D_j$, $j=1, 2, \ldots, K_o$.

In an operation 1212, the predicted class index $k_i$ for the read observation vector may be output, for example, by storing the predicted class index with the observation vector to predicted dataset 1126. In addition, or in the alternative, the predicted class index may be presented on third display 1116, printed on third printer 1120, sent to another computing device using fifth communication interface 1106, an alarm or other alert signal may be sounded through third speaker 1118, etc.

In an operation 1214, a determination is made concerning whether or not second data 1124 includes another observation vector. When second data 1124 includes another observation vector, processing continues in an operation 1216. When second data 1124 does not include another observation vector, processing continues in an operation 1218.

In operation 1216, a next observation vector is read from second data 1124, and processing continues in operation 1210.

In operation 1218, processing stops and cleanup is performed as needed.

There are applications for classification model training application 122, classification model training application 422, controller application 512, worker application 612, and/or prediction application 1122 in many areas such as process control and equipment health monitoring, image processing and classification, data segmentation, data analysis, etc. Classification model training application 422, controller application 512, and worker application 612 provide efficient distributed and parallel computing device implementations for training classification models. The presented results demonstrate improved model accuracies.

The explosion of digital data is generating many opportunities for big data analytics, which in turn provides many opportunities for training classification models to capitalize on the information contained in the data—to make better predictions that lead to better decisions.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

initialize a weight value for each class of a plurality of classes;

initialize a mean vector for each class of the plurality of classes, wherein each mean vector defines a center location vector for each class of the plurality of classes;

initialize a covariance matrix for each class of the plurality of classes, wherein each covariance matrix defines a shape of each class of the plurality of classes relative to a respective center location vector;

(A) compute an estimation vector for each observation vector of a plurality of observation vectors using the initialized weight value, the initialized mean vector, and the initialized covariance matrix, wherein the estimation vector includes a probability value of a classification in each class of the plurality of classes for each respective observation vector, wherein the probability value indicates a likelihood that a respective observation vector is associated with a respective class, wherein a subset of the plurality of observation vectors has a predefined class assignment;

(B) update the weight value for each class of the plurality of classes using the computed estimation vector for each observation vector of the plurality of observation vectors;

(C) update the mean vector for each class of the plurality of classes using the computed estimation vector for each observation vector of the plurality of observation vectors;

(D) update the covariance matrix for each class of the plurality of classes using the computed estimation vector for each observation vector of the plurality of observation vectors and the updated mean vector;

(E) compute a convergence parameter value;

(F) train a classification model by repeating (A) to (E) with the initialized weight value replaced with the updated weight value, with the initialized mean vector replaced with the updated mean vector, and with the initialized covariance matrix replaced with the updated covariance matrix for each class of the plurality of classes until the computed convergence parameter value indicates the mean vector for each class of the plurality of classes is converged; and (G) output the updated mean vector and the updated covariance matrix for each class of the plurality of classes to define the trained classification model.

2. The non-transitory computer-readable medium of claim 1, wherein the weight value is initialized using successive random draws from a multinomial distribution such that a sum of the weight values of the plurality of classes is one.

3. The non-transitory computer-readable medium of claim 1, wherein the weight value is initialized using a value 1/K for each class of the plurality of classes, where K is a number of classes of the plurality of classes.

4. The non-transitory computer-readable medium of claim 1, wherein the mean vector for each class of the plurality of classes is initialized with a sample mean vector computed from the plurality of observation vectors, wherein each observation vector includes a variable value for each of a plurality of variables.

5. The non-transitory computer-readable medium of claim 4, wherein the covariance matrix for each class of the plurality of classes is initialized with a sample covariance matrix computed from the plurality of observation vectors.

6. The non-transitory computer-readable medium of claim 1, wherein the convergence parameter value is a number of iterations of (E) and convergence is determined after a predefined maximum number of iterations of (E).

7. The non-transitory computer-readable medium of claim 1, wherein the convergence parameter value is computed using $\theta = \sum_{j=1}^{K+1} \|a_j - a_j'\|$, where K is a number of classes of the plurality of classes, $a_j$ is the updated mean vector computed in (C) for a $j^{th}$ class, and $a_j'$ is the updated mean vector computed in a previous iteration of (C) for the $j^{th}$ class.

8. The non-transitory computer-readable medium of claim 1, wherein after (F) and before (G), the computer-readable instructions further cause the computing device to:

(H) compute a joint log likelihood value using the updated weight value, the updated mean vector, and the updated covariance matrix for each class of the plurality of classes;

(I) store the joint log likelihood value in association with a number of classes of the plurality of classes;

(J) increment a number of classes of the number of classes;

(K) reinitialize the weight value;

(L) reinitialize the mean vector;

(M) reinitialize the covariance matrix;

(N) repeat (A) to (F); and (O) repeat (H) to (N) until a predefined maximum number of classes is processed to further train the classification model.

9. The non-transitory computer-readable medium of claim 8, wherein the joint log likelihood value is computed using $W_{ll} = \sum_{i=1}^{n} \log \pi_{l_i} G(a_{l_i}, \Sigma_{l_i}) + \sum_{i=n+1}^{N} \sum_{j=1}^{K} z_{i,j} \log \pi_j G(x_i, \Sigma_j)$, where $W_{ll}$ is the joint log likelihood value, n is a number of observation vectors included in the subset of the plurality of observation vectors that has the predefined class assignment, N is a number of observation vectors included in the plurality of observation vectors, K is a number of classes of the plurality of classes, $l_i$ indicates an index to a class of the plurality of classes defined by a target variable value $y_i$ of an $i^{th}$ observation vector included in the subset of the plurality of observation vectors that has the predefined class assignment, $\pi_{l_i}$ is the weight value of the class having index $l_i$, $G(a_{l_i}, \Sigma_{l_i})$ indicates a Gaussian random vector selected from a Gaussian distribution using $a_{l_i}$ and $\Sigma_{l_i}$ as parameters, $a_{l_i}$ is the mean vector of the class having index $l_i$, $\Sigma_{l_i}$ is the covariance matrix of the class having index $l_i$, $z_{i,j}$ is an estimation value of the estimation vector of the $i^{th}$ observation vector included in the plurality of observation vectors, is the weight value of the class having index j, $G(x_i, \Sigma_j)$ indicates the Gaussian random vector selected from the Gaussian distribution using $x_i$ and $\Sigma_j$ as parameters, $x_i$ is the $i^{th}$ observation vector included in the plurality of observation vectors, $\Sigma_j$ is the covariance matrix of the class having index j.

10. The non-transitory computer-readable medium of claim 8, wherein after (O) and before (G), the computer-readable instructions further cause the computing device to:

select a best number of classes value for the trained classification model based on an extremum value of the computed, stored joint log likelihood value, wherein the updated mean vector and the updated covariance matrix for each class of the plurality of classes output to define the trained classification model are associated with the selected best number of classes value.

11. The non-transitory computer-readable medium of claim 10, wherein the extremum value is a maximum value.

12. The non-transitory computer-readable medium of claim 8, wherein the plurality of observation vectors are distributed across a plurality of threads, wherein the joint log likelihood value is computed by each thread of the plurality of threads using each observation vector of the plurality of observation vectors distributed to each respective thread of the plurality of threads.

13. The non-transitory computer-readable medium of claim 1, wherein, after (F), the computer-readable instructions further cause the computing device to:

read a new observation vector from a dataset;

assign the read new observation vector to a class of the selected best number of classes value based on the read new observation vector and the mean vector for each class of the plurality of classes; and output the assigned class.

14. The non-transitory computer-readable medium of claim 1, wherein after (F), the computer-readable instructions further cause the computing device to:

determine a classification for each observation vector of the plurality of observation vectors using the mean vector for each class of the plurality of classes; and output the determined classification for each observation vector.

15. The non-transitory computer-readable medium of claim 14, wherein the classification is determined by computing a distance value from a respective observation vector of the plurality of observation vectors to each mean vector for each class of the plurality of classes.

16. The non-transitory computer-readable medium of claim 15, wherein a Euclidian distance value is computed.

17. The non-transitory computer-readable medium of claim 15, wherein the determined classification is associated with the class of the plurality of classes for which the computed distance value is a minimum relative to other classes of the plurality of classes.

18. The non-transitory computer-readable medium of claim 1, wherein, after (F), the computer-readable instructions further cause the computing device to:
   read a new observation vector from a dataset;
   assign the read new observation vector to a class of the determined number of classes based on the read new observation vector and the mean vector for each class of the plurality of classes; and
   output the assigned class.

19. The non-transitory computer-readable medium of claim 1, wherein the plurality of observation vectors are distributed across a plurality of threads,
   wherein (A) is performed by each thread of the plurality of threads;
   wherein before (B), a number of samples value is computed for each class of the plurality of classes using the computed estimation vector for each observation vector of the plurality of observation vectors distributed to each respective thread of the plurality of threads,
   wherein the weight value for each class of the plurality of classes in (B) is computed using the computed number of samples value summed from each thread of the plurality of threads.

20. The non-transitory computer-readable medium of claim 19, wherein after each thread computes the number of samples value and before (B), the computer-readable instructions further cause the computing device to:
   receive a local mean vector for each class of the plurality of classes from each thread of the plurality of threads, wherein the local mean vector is computed by each thread of the plurality of threads using the computed estimation vector for each observation vector of the plurality of observation vectors distributed to each respective thread of the plurality of threads; and
   receive a covariance matrix for each class of the plurality of classes from each thread of the plurality of threads, wherein the local covariance matrix is computed by each thread of the plurality of threads using the computed estimation vector for each observation vector of the plurality of observation vectors distributed to each respective thread of the plurality of threads.

21. The non-transitory computer-readable medium of claim 1, wherein the plurality of observation vectors are distributed across a plurality of worker computing devices,
   wherein (A) is performed by each worker computing device of the plurality of worker computing devices;
   wherein before (B), each worker computing device of the plurality of worker computing devices computed a number of samples value for each class of the plurality of classes using the computed estimation vector for each observation vector of the plurality of observation vectors distributed to each respective thread of the plurality of threads,
   wherein the weight value for each class of the plurality of classes in (B) is computed using the computed number of samples value summed from each worker computing device of the plurality of worker computing devices.

22. The non-transitory computer-readable medium of claim 1, wherein the weight value is updated using $$\pi_j = \frac{1}{N} \sum_{i=1}^{N} z_{i,j}, \quad j = 1, 2, \ldots, K,$$

where $\pi_j$ is the weight value of a $j^{th}$ class, N is a number of observation vectors included in the plurality of observation vectors, K is a number of classes of the plurality of classes, and $z_{i,j}$ is an estimation value of an $i^{th}$ observation vector and the $j^{th}$ class.

23. The non-transitory computer-readable medium of claim 22, wherein the mean vector is updated using $$a_j = \frac{1}{S_j} \left( \sum_{i=n+1}^{N} z_{i,j} x_i + \sum_{i=1}^{n} z_{i,j} a'_j \right), \quad j = 1, 2, \ldots, K,$$

where $a_j$ is the mean vector of the $j^{th}$ class, n is a number of observation vectors included in the subset of the plurality of observation vectors that has the predefined class assignment, $S_j$ is a number of samples vector of the $j^{th}$ class, $x_i$ is the $i^{th}$ observation vector, and $a_j'$ is the mean vector of the $j^{th}$ class of a previous iteration of (C).

24. The non-transitory computer-readable medium of claim 23, wherein the covariance matrix is updated using $$\sum\nolimits_j = \frac{1}{S_j} \left( \sum_{i=1}^{N} z_{i,j} (x_i - a_j)(x_i - a_j)^\top \right), \quad j = 1, 2, \ldots, K.$$

25. A system comprising:
   a processor; and
   a computer-readable medium operably coupled to the processor, the computer-readable medium having computer-readable instructions stored thereon that, when executed by the processor, cause the system to
      initialize a weight value for each class of a plurality of classes;
      initialize a mean vector for each class of the plurality of classes, wherein each mean vector defines a center location vector for each class of the plurality of classes;
      initialize a covariance matrix for each class of the plurality of classes, wherein each covariance matrix defines a shape of each class of the plurality of classes relative to a respective center location vector;
      (A) compute an estimation vector for each observation vector of a plurality of observation vectors using the initialized weight value, the initialized mean vector, and the initialized covariance matrix, wherein the estimation vector includes a probability value of a classification in each class of the plurality of classes for each respective observation vector, wherein the probability value indicates a likelihood that a respective observation vector is associated with a respective class, wherein a subset of the plurality of observation vectors has a predefined class assignment;
      (B) update the weight value for each class of the plurality of classes using the computed estimation vector for each observation vector of the plurality of observation vectors;
      (C) update the mean vector for each class of the plurality of classes using the computed estimation vector for each observation vector of the plurality of observation vectors;
      (D) update the covariance matrix for each class of the plurality of classes using the computed estimation vector for each observation vector of the plurality of observation vectors and the updated mean vector;

(E) compute a convergence parameter value;
(F) train a classification model by repeating (A) to (E) with the initialized weight value replaced with the updated weight value, with the initialized mean vector replaced with the updated mean vector, and with the initialized covariance matrix replaced with the updated covariance matrix for each class of the plurality of classes until the computed convergence parameter value indicates the mean vector for each class of the plurality of classes is converged; and
(G) output the updated mean vector and the updated covariance matrix for each class of the plurality of classes to define the trained classification model.

26. A method of training a classification model, the method comprising:
initializing, by a computing device, a weight value for each class of a plurality of classes;
initializing, by the computing device, a mean vector for each class of the plurality of classes, wherein each mean vector defines a center location vector for each class of the plurality of classes;
initializing, by the computing device, a covariance matrix for each class of the plurality of classes, wherein each covariance matrix defines a shape of each class of the plurality of classes relative to a respective center location vector;
(A) computing, by the computing device, an estimation vector for each observation vector of a plurality of observation vectors using the initialized weight value, the initialized mean vector, and the initialized covariance matrix, wherein the estimation vector includes a probability value of a classification in each class of the plurality of classes for each respective observation vector, wherein the probability value indicates a likelihood that a respective observation vector is associated with a respective class, wherein a subset of the plurality of observation vectors has a predefined class assignment;
(B) updating, by the computing device, the weight value for each class of the plurality of classes using the computed estimation vector for each observation vector of the plurality of observation vectors;
(C) updating, by the computing device, the mean vector for each class of the plurality of classes using the computed estimation vector for each observation vector of the plurality of observation vectors;
(D) updating, by the computing device, the covariance matrix for each class of the plurality of classes using the computed estimation vector for each observation vector of the plurality of observation vectors and the updated mean vector;
(E) computing, by the computing device, a convergence parameter value;
(F) training, by the computing device, a classification model by repeating (A) to (E) with the initialized weight value replaced with the updated weight value, with the initialized mean vector replaced with the updated mean vector, and with the initialized covariance matrix replaced with the updated covariance matrix for each class of the plurality of classes until the computed convergence parameter value indicates the mean vector for each class of the plurality of classes is converged; and
(G) outputting, by the computing device, the updated mean vector and the updated covariance matrix for each class of the plurality of classes to define the trained classification model.

27. The method of claim 26, wherein the convergence parameter value is computed using $\theta=\Sigma_{j=1}^{K+1}\|a_j-a_j'\|$, where K is a number of classes of the plurality of classes, $a_j$ is the updated mean vector computed in (C) for a $j^{th}$ class, and $a_j'$ is the updated mean vector computed in a previous iteration of (C) for the $j^{th}$ class.

28. The method of claim 26, wherein after (F) and before (G) further comprising:
(H) computing, by the computing device, a joint log likelihood value using the updated weight value, the updated mean vector, and the updated covariance matrix for each class of the plurality of classes;
(I) storing, by the computing device, the joint log likelihood value in association with a number of classes of the plurality of classes;
(J) incrementing, by the computing device, a number of classes of the number of classes;
(K) reinitializing, by the computing device, the weight value;
(L) reinitializing, by the computing device, the mean vector;
(M) reinitializing, by the computing device, the covariance matrix;
(N) repeating, by the computing device, (A) to (F); and
(O) repeating, by the computing device, (H) to (N) until a predefined maximum number of classes is processed to further train the classification model.

29. The method of claim 28, wherein the joint log likelihood value is computed using $W_{ll}=\Sigma_{i=1}^{n} \log \pi_{l_i} G(a_{l_i}, \Sigma_{l_i})+\Sigma_{i=n+1}^{N}\Sigma_{j=1}^{K} z_{i,j} \log \pi_j G(x_i, \Sigma_j)$, where $W_{ll}$ is the joint log likelihood value, n is a number of observation vectors included in the subset of the plurality of observation vectors that has the predefined class assignment, N is a number of observation vectors included in the plurality of observation vectors, K is a number of classes of the plurality of classes, $l_i$ indicates an index to a class of the plurality of classes defined by a target variable value $y_i$ of an $i^{th}$ observation vector included in the subset of the plurality of observation vectors that has the predefined class assignment, $\pi_{l_i}$ is the weight value of the class having index $l_i$, $G(a_{l_i}, \Sigma_{l_i})$ indicates a Gaussian random vector selected from a Gaussian distribution using $a_{l_i}$ and $\Sigma_{l_i}$ as parameters, $a_{l_i}$ is the mean vector of the class having index $l_i$, $\Sigma_{l_i}$ is the covariance matrix of the class having index $l_i$, $z_{i,j}$ is an estimation value of the estimation vector of the $i^{th}$ observation vector included in the plurality of observation vectors, $\pi_j$ is the weight value of the class having index j, $G(x_i, \Sigma_j)$ indicates the Gaussian random vector selected from the Gaussian distribution using $x_i$ and $\Sigma_j$ as parameters, $x_i$ is the $i^{th}$ observation vector included in the plurality of observation vectors, $\Sigma_j$ is the covariance matrix of the class having index j.

30. The method of claim 28, wherein after (O) and before (G), further comprising:
selecting, by the computing device, a best number of classes value for the trained classification model based on an extremum value of the computed, stored joint log likelihood value,
wherein the updated mean vector and the updated covariance matrix for each class of the plurality of classes output to define the trained classification model are associated with the selected best number of classes value.

* * * * *

UNITED STATES PATENT AND TRADEMARK OFFICE
CERTIFICATE OF CORRECTION

PATENT NO. : 10,635,947 B2
APPLICATION NO. : 16/587104
DATED : April 28, 2020
INVENTOR(S) : Xu Chen et al.

It is certified that error appears in the above-identified patent and that said Letters Patent is hereby corrected as shown below:

In the Specification

Column 11, Line 25:
Delete the phrase "$\Sigma_{j=1}^{K} \pi_j = 1.$" and replace with -- $\sum_{j=1}^{K} \pi_j = 1.$ --.

Column 11, Line 64:
Delete the phrase "$S_j = \Sigma_{i=1}^{N} Z_{i,j}, j = 1, 2, \ldots, K.$" and replace with -- $S_j = \sum_{i=1}^{N} z_{i,j}, j = 1, 2, \ldots, K.$ --.

Column 12, Line 44:
Delete the phrase "$\theta = \sum_{j=1}^{K} \|a_j - a_j'\|$," and replace with -- $\theta = \sum_{j=1}^{K} \|a_j - a_j'\|$ --.

Column 12, Lines 57-58:
Delete the phrase "$W_{ll} = \sum_{i=1}^{n} \log \pi_{l_i} G(a_{l_i}, \Sigma_{l_i}) + \sum_{i=n+1}^{N} \sum_{j=1}^{K} z_{i,j} \log \pi_j G(x_i, \Sigma_j),$" and replace with -- $W_{ll} = \sum_{i=1}^{n} \log \pi_{l_i} G(a_{l_i}, \Sigma_{l_i}) + \sum_{i=n+1}^{N} \sum_{j=1}^{K} z_{i,j} \log \pi_j G(x_i, \Sigma_j).$ --.

Column 20, Line 23:
Delete the phrase "$\Sigma_{i=1}^{n_{w,t}} x_i$" and replace with -- $\sum_{i=1}^{n_{w,t}} x_i$ --.

Column 20, Line 37:
Delete the phrase "$\Sigma_{i=1}^{n_{w,t}} x_i$" and replace with -- $\sum_{i=1}^{n_{w,t}} x_i$ --.

Column 20, Line 41:
Delete the phrase "$\Sigma_{i=1}^{n_{w,t}} x_i$" and replace with -- $\sum_{i=1}^{n_{w,t}} x_i$ --.

Column 20, Line 56:

Signed and Sealed this
Eighteenth Day of August, 2020

Andrei Iancu
*Director of the United States Patent and Trademark Office*

Delete the phrase "$N = n + \Sigma_{w=1}^{W}\Sigma_{t=1}^{T} n_{w,t},$" and replace with --$N = n + \sum_{w=1}^{W}\sum_{t=1}^{T} n_{w,t},$--.

Column 20, Line 59:

Delete the phrase "$\Sigma_{i=1}^{n} x_i$" and replace with --$\sum_{i=1}^{n} x_i$--.

Column 20, Line 65:

Delete the phrase "$\sum_{i=1}^{n_{w,t}}(x_i - m)(x_i - m)^T$" and replace with --$\sum_{i=1}^{n_{w,t}}(x_i - m)(x_i - m)^\top$--.

Column 21, Line 8:

Delete the phrase "$\sum_{i=1}^{n_{w,t}}(x_i - m)(x_i - m)^T$" and replace with --$\sum_{i=1}^{n_{w,t}}(x_i - m)(x_i - m)^\top$--.

Column 21, Line 12:

Delete the phrase "$\sum_{i=1}^{n_{w,t}}(x_i - m)(x_i - m)^T$" and replace with --$\sum_{i=1}^{n_{w,t}}(x_i - m)(x_i - m)^\top$--.

Column 21, Line 28:

Delete the phrase "$\Sigma_{i=1}^{n}(x_i - m)(x_i - m)^T$" and replace with --$\sum_{i=1}^{n}(x_i - m)(x_i - m)^\top$--.

Column 21, Line 65:

Delete the phrase "$S_j = \Sigma_{w=1}^{W}\Sigma_{t=1}^{T} S_{w,t,j} + n, j = 1, 2, \ldots, K.$" and replace with --$S_j = \sum_{w=1}^{W}\sum_{t=1}^{T} S_{w,t,j} + n, j = 1, 2, \ldots, K.$--.

Column 22, Lines 13-14:

Delete the phrase "$a_j = \frac{1}{S_j}(\sum_{t=1}^{W}\sum_{t=1}^{T} a_{w,t,j} + \sum_{i=1}^{n} z_{i,j} a_j'), j = 1, 2, \ldots, K.$" and replace with --$a_j = \frac{1}{S_j}(\sum_{w=1}^{W}\sum_{t=1}^{T} a_{w,t,j} + \sum_{i=1}^{n} z_{i,j} a_j'), j = 1, 2, \ldots, K.$--.

Column 22, Line 18:

Delete the phrase "$\Sigma_{i=1}^{n} z_{i,j} a_j'$" and replace with --$\sum_{i=1}^{n} z_{i,j} a_j'$--.

Column 22, Line 32:

Delete the phrase "$\Sigma_{i=1}^{n} z_{i,j}(a_j' - a_j)(a_j' - a_j)^T$" and replace with --$\sum_{i=1}^{n} z_{i,j}(a_j' - a_j)(a_j' - a_j)^\top$--.

Column 22, Lines 36-37:

Delete the phrase "$\theta = \Sigma_{j=1}^{K}\|a_j - a_j'\|.$" and replace with --$\theta = \sum_{j=1}^{K}\|a_j - a_j'\|.$--.

Column 22, Line 51:

Delete the phrase "$\Sigma_{i=1}^{n_{w,t}} \Sigma_{j=1}^{K} z_{i,j} \log \pi_j G(x_i|a_j, \Sigma_j)$," and replace with --$\sum_{i=1}^{n_{w,t}} \sum_{j=1}^{K} z_{i,j} \log \pi_j G(x_i|a_j, \Sigma_j)$--.

Column 22, Line 59:
Delete the phrase "$\Sigma_{i=1}^{n_{w,t}} \Sigma_{j=1}^{K} z_{i,j} \log \pi_j G(x_i|a_j, \Sigma_j)$," and replace with --$\sum_{i=1}^{n_{w,t}} \sum_{j=1}^{K} z_{i,j} \log \pi_j G(x_i|a_j, \Sigma_j)$--.

Column 22, Lines 63-64:
Delete the phrase "$\Sigma_{i=1}^{n_{w,t}} \Sigma_{j=1}^{K} z_{i,j} \log \pi_j G(x_i|a_j, \Sigma_j)$," and replace with --$\sum_{i=1}^{n_{w,t}} \sum_{j=1}^{K} z_{i,j} \log \pi_j G(x_i|a_j, \Sigma_j)$--.

Column 22, Line 67:
Delete the phrase "$W_{ll} = \Sigma_{w=1}^{W} \Sigma_{t=1}^{T} w_{w,t}$." and replace with --$W_{ll} = \sum_{w=1}^{W} \sum_{t=1}^{T} w_{w,t}$--.

Column 24, Line 9:
Delete the phrase "$\Sigma_{i=1}^{n} x_i$" and replace with --$\sum_{i=1}^{n} x_i$--.

Column 24, Line 45:
Delete the phrase "$\Sigma_{i=1}^{n_{w,t}} (x_i - m)(x_i - m)^T$," and replace with --$\sum_{i=1}^{n_{w,t}} (x_i - m)(x_i - m)^\top$--.

Column 24, Line 52:
Delete the phrase "where $p$ is a matrix with Nock values." and replace with --where $p$ is a matrix with $N_v \times N_v$ values.--.

Column 24, Line 59:
Delete the phrase "$p = p + (x_i - m)(x_i - m)^T$." and replace with --$p = p + (x_i - m)(x_i - m)^\top$--.

Column 25, Lines 32-33:
Delete the phrase "$S_j = \Sigma_{i=1}^{N} z_{i,j}, j = 1, 2, \ldots, K$." and replace with --$S_j = \sum_{i=1}^{N} z_{i,j}, j = 1, 2, \ldots, K$--.

Column 25, Lines 47-48:
Delete the phrase "$\Sigma_j = \frac{1}{S_j} (\sum_{i=1}^{N} z_{i,j}(x_i - a_j)(x_i - a_j)^\top, j = 1, 2, \ldots, K$." and replace with --$\Sigma_j = \frac{1}{S_j} \sum_{i=1}^{N} z_{i,j}(x_i - a_j)(x_i - a_j)^\top, j = 1, 2, \ldots, K$--.

Column 26, Line 3:

Delete the phrase "$W_{ll} = W_{ll} + \Sigma_{j=1}^{K} z_{i,j} \log \pi_j G(x_i, \Sigma_j).$" and replace with --$W_{ll} = W_{ll} + \sum_{j=1}^{K} z_{i,j} \log \pi_j G(x_i, \Sigma_j).$--.

In the Claims

Claim 7, Column 33, Line 37:
Delete the phrase "$\theta = \Sigma_{j=1}^{K+1} \|a_j - a'_j\|,$" and replace with --$\theta = \sum_{j=1}^{K+1} \|a_j - a'_j\|,$--.

Claim 9, Column 33, Line 62:
Delete the phrase "$W_{ll} = \Sigma_{i=1}^{n} \log \pi_{l_i} G(a_{l_i}, \Sigma_{l_i}) + \Sigma_{i=n+1}^{N} \Sigma_{j=1}^{K} z_{i,j} \log \pi_j G(x_i, \Sigma_j),$" and replace with --$W_{ll} = \sum_{i=1}^{n} \log \pi_{l_i} G(a_{l_i}, \Sigma_{l_i}) + \sum_{i=n+1}^{N} \sum_{j=1}^{K} z_{i,j} \log \pi_j G(x_i, \Sigma_j),$--.

Claim 24, Column 36, Lines 25-26:
Delete the phrase "$\Sigma_j = \frac{1}{s_j} (\Sigma_{i=1}^{N} z_{i,j}(x_i - a_j)(x_i - a_j)^\top, j = 1, 2, \ldots, K.$" and replace with --$\Sigma_j = \frac{1}{s_j} \sum_{i=1}^{N} z_{i,j}(x_i - a_j)(x_i - a_j)^\top, j = 1, 2, \ldots, K.$--.

Claim 27, Column 38, Line 4:
Delete the phrase "$\theta = \Sigma_{j=1}^{K+1} \|a_j - a'_j\|,$" and replace with --$\theta = \sum_{j=1}^{K+1} \|a_j - a'_j\|,$--.

Claim 29, Column 38, Lines 31-32:
Delete the phrase "$W_{ll} = \Sigma_{i=1}^{n} \log \pi_{l_i} G(a_{l_i}, \Sigma_{l_i}) + \Sigma_{i=n+1}^{N} \Sigma_{j=1}^{K} z_{i,j} \log \pi_j G(x_i, \Sigma_j),$" and replace with --$W_{ll} = \sum_{i=1}^{n} \log \pi_{l_i} G(a_{l_i}, \Sigma_{l_i}) + \sum_{i=n+1}^{N} \sum_{j=1}^{K} z_{i,j} \log \pi_j G(x_i, \Sigma_j),$--.

Claim 29, Column 38, Line 44:
Delete the phrase "$a_{ll}$ is the mean vector" and replace with --$a_{l_i}$ is the mean vector--.